US011294736B2

(12) United States Patent
Arikuma et al.

(10) Patent No.: US 11,294,736 B2
(45) Date of Patent: Apr. 5, 2022

(54) DISTRIBUTED PROCESSING SYSTEM, DISTRIBUTED PROCESSING METHOD, AND RECORDING MEDIUM

(71) Applicant: NEC Corporation, Tokyo (JP)

(72) Inventors: Takeshi Arikuma, Tokyo (JP); Takatoshi Kitano, Tokyo (JP); Yosuke Iwamatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 373 days.

(21) Appl. No.: 16/332,257

(22) PCT Filed: Sep. 15, 2017

(86) PCT No.: PCT/JP2017/033449
§ 371 (c)(1),
(2) Date: Mar. 11, 2019

(87) PCT Pub. No.: WO2018/061825
PCT Pub. Date: Apr. 5, 2018

(65) Prior Publication Data
US 2019/0213052 A1    Jul. 11, 2019

(30) Foreign Application Priority Data
Sep. 29, 2016 (JP) ............................. JP2016-190473

(51) Int. Cl.
*G06F 9/46* (2006.01)
*G06F 9/50* (2006.01)
(Continued)

(52) U.S. Cl.
CPC .......... *G06F 9/5088* (2013.01); *G06F 9/4856* (2013.01); *G06F 9/50* (2013.01); *G06F 13/00* (2013.01); *G06F 2209/5019* (2013.01)

(58) Field of Classification Search
CPC ..................................................... G06F 9/5088
(Continued)

(56) References Cited

U.S. PATENT DOCUMENTS 6,275,470 B1 * 8/2001 Ricciulli ............... H04L 45/124
370/238
8,561,072 B2 * 10/2013 Ringseth ............... G06F 9/4881
718/102

(Continued)

FOREIGN PATENT DOCUMENTS

JP       08-87473      4/1996
JP    2005-148911 A    6/2005
(Continued)

OTHER PUBLICATIONS

International Search Report in the corresponding PCT International Application.
(Continued)

*Primary Examiner* — Evral E Bodden

(57) ABSTRACT

The management node includes a performance information integration unit which integrates performance information pertaining to the analysis node connected to the management node. The analysis node includes a task determination unit which determines, based on a first cost, being calculated based on performance information pertaining to the analysis node, of executing a task in the analysis node, and a second cost being calculated based on performance information pertaining to another of the analysis nodes different from the analysis node integrated by the performance information integration unit, and representing a cost of load distribution of distributing the task to the another analysis node and then executing the task, whether to execute the task in the analysis node, or distribute the task to the another analysis node and then execute the task.

9 Claims, 17 Drawing Sheets

(51) Int. Cl.
*G06F 9/48* (2006.01)
*G06F 13/00* (2006.01)

(58) Field of Classification Search
USPC .......................................................... 718/105
See application file for complete search history.

(56) References Cited

U.S. PATENT DOCUMENTS 10,373,102 B2 *   8/2019   Deshpande ......... G06F 16/1734
2019/0286484 A1*  9/2019   Meirosu ................ G06F 9/4887

FOREIGN PATENT DOCUMENTS

| | | | |
|---|---|---|---|
| JP | 2005148911 A | * | 6/2005 |
| JP | 2014-102691 A | | 6/2014 |
| JP | 2014-236465 A | | 12/2014 |
| WO | 2012/095983 | | 7/2012 |
| WO | 2013/005322 | | 1/2013 |
| WO | WO 2015/125453 A1 | | 8/2015 |

OTHER PUBLICATIONS

Japanese Office Action for JP Application No. 2018-542397 dated Oct. 19, 2021 with English Translation.

* cited by examiner

Fig. 4

| ANALYSIS NODE ID | THROUGHPUT | NUMBER OF TASKS WAITING FOR PROCESSING | NW DELAY | UPDATE DATE AND TIME |
|---|---|---|---|---|
| 192.168.0.1 | 2 | 0 | 3.3 | 2016/2/20 12:11:11.223 |
| 192.168.0.4 | 5 | 5 | 0.6 | 2016/2/20 12:11:11.384 |
| 192.168.0.5 | 3 | 7 | 1.1 | 2016/2/20 12:11:10.992 |

Fig. 5

| THROUGHPUT | NUMBER OF TASKS WAITING FOR PROCESSING | NW DELAY | NUMBER OF NODES | UPDATE DATE AND TIME |
|---|---|---|---|---|
| 3.3 | 4 | 1.67 | 3 | 2016/2/20 12:11:11.500 |

Fig. 6

| TASK ID | TRANSMISSION NODE ID | TASK DATA | RECEPTION DATE AND TIME |
|---|---|---|---|
| 1 | 192.168.0.1 | TASK A | 2016/2/20 12:11:11.232 |
| 2 | 192.168.0.4 | TASK B | 2016/2/20 12:11:12.322 |

Fig. 12

| THROUGHPUT | NUMBER OF TASKS WAITING FOR PROCESSING | NW DELAY | NUMBER OF NODES | UPDATE DATE AND TIME |
|---|---|---|---|---|
| 3.3 | 4.6 | 1.67 | 3 | 2016/2/20 12:11:11.500 |

DISTRIBUTED PROCESSING SYSTEM, DISTRIBUTED PROCESSING METHOD, AND RECORDING MEDIUM

CROSS-REFERENCE TO RELATED PATENT APPLICATIONS

This application is a National Stage Entry of International Application No. PCT/JP2017/033449, filed Sep. 15, 2017, which claims priority from Japanese Patent Application No, 2016-190473, filed Sep. 29, 2016. The entire contents of the above-referenced applications are expressly incorporated herein by reference.

TECHNICAL FIELD

The present invention relates to a distributed processing system, a distributed processing method, a program, and the like being used for a distributed processing environment of a video image stream.

BACKGROUND ART

A technique for distributedly processing a task efficiently without complicating a network configuration is disclosed in PTL 1. PTL 1 describes a technique for delivering processing-related information including a processing capability and a processing load of a certain information processing device to a peripheral information processing device, collecting processing-related information from the peripheral device, and thereby determining whether to process-a task in the certain information processing device, or transmit the task to another peripheral device. The technique disclosed in PTL 1 includes a configuration which sends, when processing a task in a certain information processing device, the task to a task processing unit of the information processing device, or transmits, when transmitting a task to another peripheral device, the task to a task reception unit of the another peripheral device, and requests the another peripheral device to process the task.

CITATION LIST

Patent Literature

[PTL 1] Japanese Unexamined Patent Application Publication No. 2014-102691

SUMMARY OF INVENTION

Technical Problem

The technique disclosed in PTL 1 collects processing-related information of a peripheral device, acquires processing-related information of the peripheral device, and determines whether to process a task in the information processing device, or transmit the task to another peripheral device. Herein, processing of determining assignment of a task in the technique disclosed in PTL 1 premises that collection of processing-related information of a peripheral device is performed with higher frequency than a variation period of processing-related information in the peripheral device.

However, for example, in a distributed processing environment of a video image stream, there is a case where a period and a variation range of a processing load of each device are large, and the processing load frequently varies. In such a case, the technique disclosed in PTL 1 is sometimes unable to collect processing-related information of a peripheral device earlier than a variation period of the processing-related information. Therefore, the technique disclosed in PTL 1 has a problem that, when a processing load of each device frequently varies, processing-related information is not collected in time, and a task assignee cannot be correctly determined.

One example of an object of the present invention is to provide a distributed processing system, a distributed processing method, a program, and the like solving the above-described problem, and being capable of correctly determining an assignee of a task even when a processing load frequently varies.

Solution to Problem

A distributed processing system in one aspect of the present invention is configured as follows. Specifically, a distributed processing system in one aspect of the present disclosure includes: an analysis node which analyzes input information; and a management node which is connected to the analysis node via a network, and holds performance information representing performance of the analysis node. The management node includes a performance information integration unit which integrates the performance information pertaining to the analysis node connected to the management node. The analysis node includes a task determination unit which determines, based on a first cost, being calculated based on the performance information pertaining to the analysis node, of executing a task in the analysis node, and a second cost being calculated based on the performance information pertaining to another of the analysis nodes different from the analysis node integrated by the performance information integration unit, and representing a cost of load distribution of distributing the task to the another analysis node and then executing the task, whether to execute the task in the analysis node, or distribute the task to the another analysis node and then execute the task.

A distributed processing method in one aspect of the present invention includes: by an analysis node, analyzing input information; calculating a first cost of executing a task by the analysis node itself, based on performance information representing performance of the analysis node itself; calculating a second cost representing a cost of load distribution of distributing the task to another of the analysis nodes and then executing the task, based on performance information which is integrated by a management node holding performance information pertaining to one or more of the analysis nodes connected to the management node via a network, and pertains to the another analysis node; and determining, based on the calculated first cost and second cost, whether to execute the task by the analysis node itself, or execute load distribution of the task to the another analysis node.

A program in one aspect of the present invention causes a computer functioning as an analysis node to execute: processing of analyzing input information; processing of calculating a first cost of executing a task by the computer itself, based on performance information representing performance of the computer itself; processing of calculating a second cost representing a cost of load distribution of distributing the task to another of the analysis nodes and then executing the task, based on performance information which is integrated by a management node holding performance information pertaining to one or more of the analysis nodes connected to the management node via a network, and pertains to the another analysis node; and processing of determining, based on the calculated first cost and second cost, whether to execute the task by the computer itself, or execute load distribution of the task to the another analysis node.

Note that the above-described object of the present invention may be accomplished by a recording medium recording the computer program.

Furthermore, a distributed processing device in one aspect of the present invention, being capable of achieving an analysis node, includes: a task generation unit which generates a task from input information; a performance information acquisition unit which acquires performance information of a local device and integrated performance information integrating performance information of another distributed processing device; and a task determination unit which determines, based on a first cost being calculated based on the performance information of the local device and representing a cost of executing the task in the local device, and a second cost being calculated based on the integrated performance information and representing a cost of distributing the task to the another distributed processing device and then executing the task, whether to execute the task in the local device, or load the task onto the another distributed processing device and then execute the task.

Advantageous Effects of Invention

According to the present invention, it is possible to correctly determine an assignee of a task even when a processing load frequently varies.

BRIEF DESCRIPTION OF DRAWINGS

FIG. 4 is a diagram illustrating one example of performance information of an analysis node in the first example embodiment of the present invention.

FIG. 5 is a diagram illustrating one example of integrated performance information in the first example embodiment of the present invention.

FIG. 6 is a diagram illustrating one example of a surplus task in the first example embodiment of the present invention.

FIG. 12 is a diagram illustrating one example of integrated performance information in the second example embodiment of the present invention.

EXAMPLE EMBODIMENT

Figure 1:
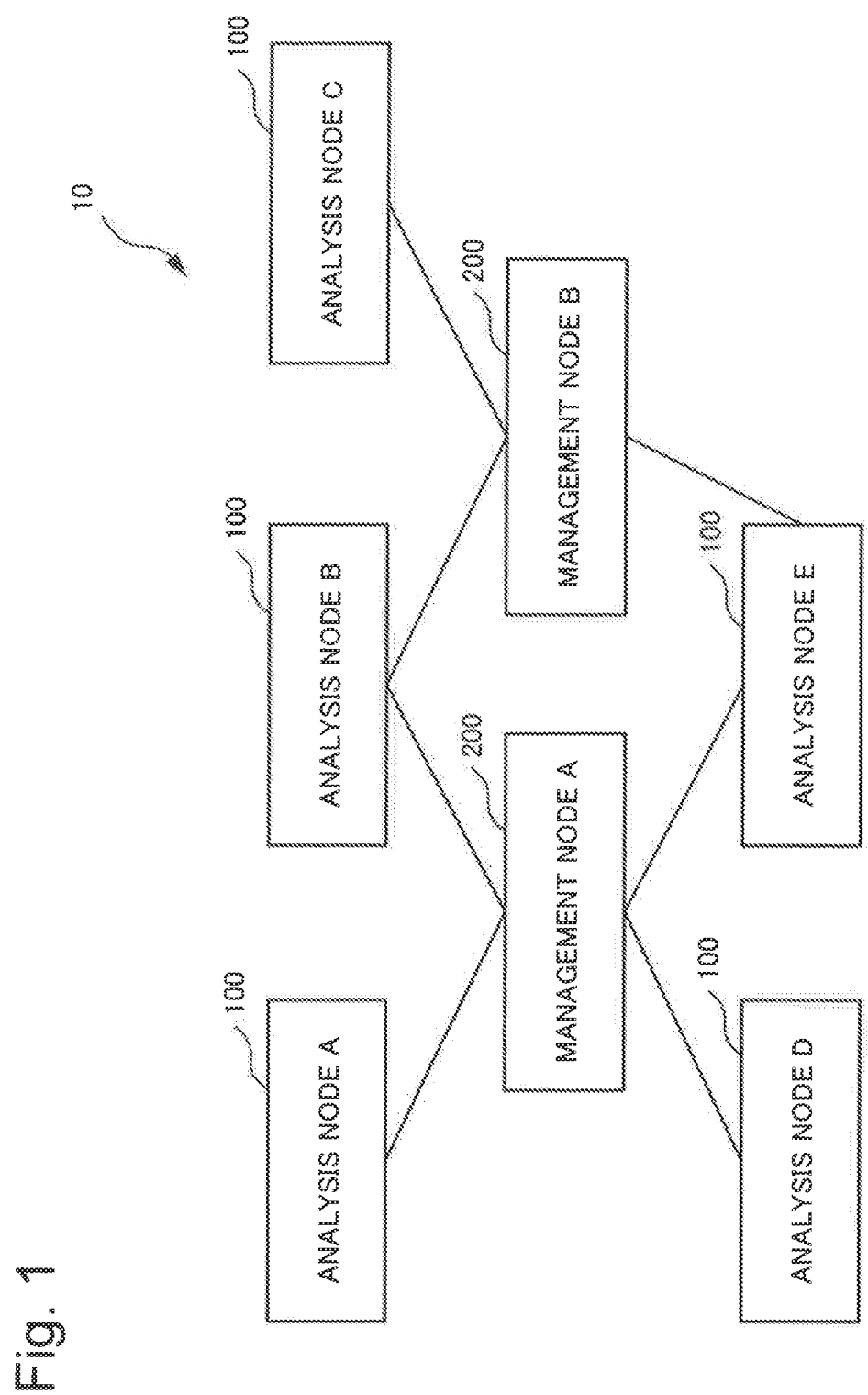
FIG. 1 is a diagram illustrating an example of an operation form of a distributed processing system in a first example embodiment of the present invention.

Hereinafter, example embodiments of the present invention will be described with reference to the drawings, but the present invention is not limited to the present example embodiments. Note that, in the drawings described below, same reference signs are given to elements having same functions, and a repeated description is omitted in some cases.

In the present example embodiment, a distributed processing system 10 including an analysis node 100 and a management node 200 having the following configurations is described as a specific example. In other words, a certain analysis node 100 is configured to calculate a cost of executing a task on the basis of performance information of another analysis node (hereinafter, described as a "neighboring analysis node 100") connected to the management node 200. Moreover, the analysis node 100 is configured to calculate a cost of distributing (load-distributing) a task to a neighboring analysis node 100 on the basis of performance information integrated by the management node 200. On the basis of the calculated first and second costs, the analysis node 100 determines whether to execute a task in the local analysis node 100, or distribute a load of a task to a neighboring analysis node 100.

FIG. 1 is a diagram illustrating an example of an operation form of the distributed processing system 10 in a first example embodiment of the present invention. As illustrated in FIG. 1, in the distributed processing system 10 according to the present example embodiment, the analysis node 100 and the management node 200 are connected to each other via a network (hereinafter, described as a network 300) such as an Internet or a local area network (LAN). A plurality of analysis nodes 100 and management nodes 200 may be included in the distributed processing system 10. Each analysis node 100 is connected to one or more management nodes 200. Note that a neighboring analysis node 100 is another analysis node 100 connected to a management node 200 (hereinafter, described as a "target management node 200" in some cases) connected to a certain analysis node 100 (hereinafter, described as a "target analysis node 100" in some cases). For example, a neighboring analysis node 100 includes one or more other analysis nodes 100 connected to a target management node 200. In the specific example of the distributed processing system 10 illustrated in FIG. 1, when a target analysis node 100 is an analysis node A, a management node A is a target management node 200, and an analysis node B, an analysis node D, and an analysis node E are neighboring analysis nodes 100.

An analysis node 100 is an information processing device such as a personal computer (PC) which analyzes input information by program control.

A management node 200 is connected to an analysis node 100 via a network, and is an information processing device such as a personal computer (PC) which manages performance information of the analysis node 100.

Figure 2:
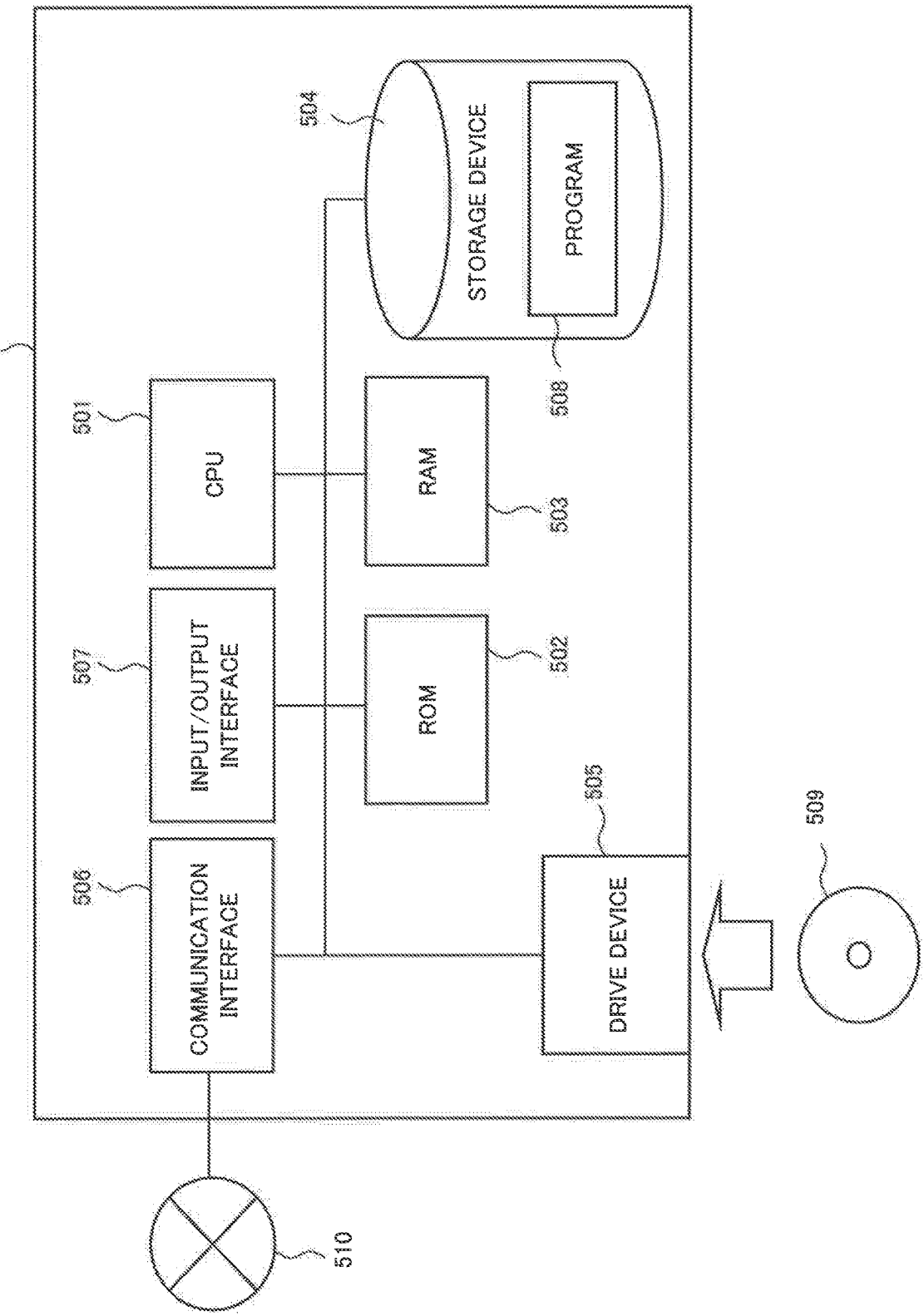
FIG. 2 is a block diagram illustrating a hardware configuration of a computer device which achieves an analysis node or the like in the present example embodiment.

Next, hardware that configures each of devices such as the analysis node 100 and the management node 200 included in the distributed processing system 10 in the present example embodiment is described. FIG. 2 is a block diagram illustrating a hardware configuration of a computer device 500 which achieves each of devices such as the analysis node 100 and the management node 200 in the present example embodiment.

As illustrated in FIG. 2, the computer device 500 includes a central processing unit (CPU) 501, a read only memory (ROM) 502, a random access memory (RAM) 503, a storage device 504, a drive device 505, a communication interface 506, and an input/output interface 507.

The CPU 501 executes a program 508 by use of the RAM 503. The program 508 may be stored in the ROM 502. Alternatively, the program 508 may be recorded in a recording medium 509, and read by the drive device 505, or may be transmitted from an external device via a network 510. The communication interface 506 transmits and receives data to and from an external device via the network 510. The input/output interface 507 exchanges data with a peripheral device (such as a keyboard, a mouse, or a display device). The communication interface 506 and the input/output interface 507 can function as a means for acquiring or outputting data. Data such as output information may be stored in the storage device 504, or included in the program 508.

Note that a processing method of recording, in a recording medium, a program (more specifically, a program which causes a computer to execute processing illustrated in FIGS. 7, 8, 9, 10, 13, 15, 16, and the like) which operates a configuration according to the following example embodiment in such a way to achieve a function of the example embodiment, reading, as a code, the program recorded in the recording medium, and executing the program in the computer also falls within each example embodiment. In other words, a computer-readable recording medium also falls within each example embodiment. Moreover, not only a recording medium recording the above-described program but also the program itself is included in each example embodiment.

As the recording medium, it is possible to use, for example, a floppy (registered trademark) disk, a hard disk, an optical disk, a magnet-optical disk, a Compact Disk Read Only Memory (CD-ROM), a magnetic tape, a non-volatile memory card, or a ROM. Moreover, not only a form which executes processing with a single program recorded in the recording medium, but also a form which operates on an Operating System (OS) and thus executes processing in cooperation with other software or a function on an extension board falls within each example embodiment.

First Example Embodiment

Figure 3:
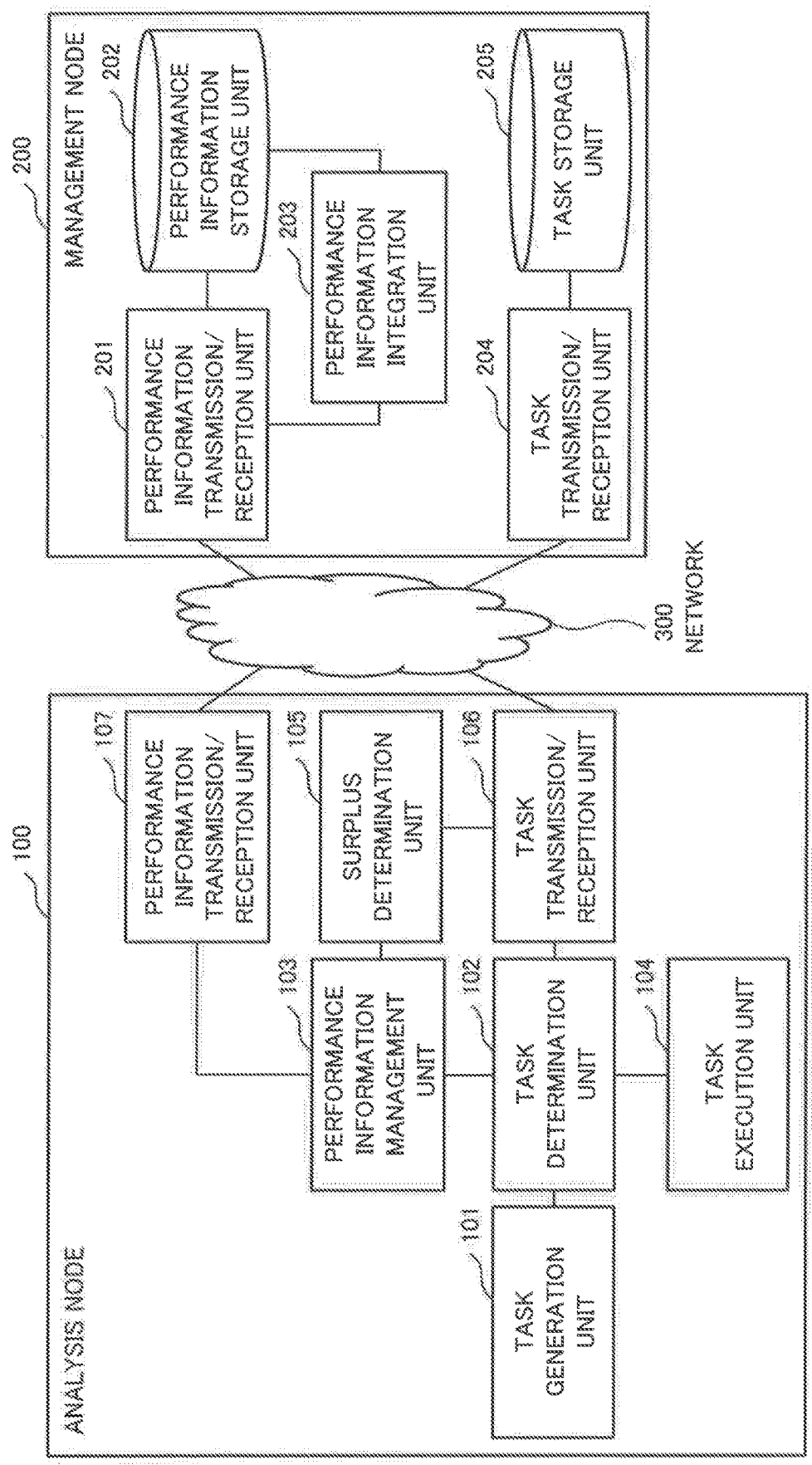
FIG. 3 is a block diagram illustrating a functional configuration of a distributed processing system in the first example embodiment of the present invention.

Next, a function of a distributed processing system 10 in the present example embodiment is described. FIG. 3 is a block diagram illustrating a functional configuration of the distributed processing system 10 in the present example embodiment. Blocks illustrated in FIG. 3 may be implemented in a single device, or separately implemented in a plurality of devices. Data may be given and received among the blocks by use of any method such as a data bus, a network, or a portable storage medium.

As illustrated in FIG. 3, the distributed processing system 10 in the present example embodiment includes an analysis node 100 and a management node 200. The analysis node 100 and the management node 200 are connected to each other via a network 300.

The analysis node 100 in the present example embodiment includes a task generation unit 101, a task determination unit 102, a performance information management unit 103, a task execution unit 104, a surplus determination unit 105, a task transmission/reception unit 106, and a performance information transmission/reception unit 107. The management node 200 in the present example embodiment includes a performance information transmission/reception unit 201, a performance information storage unit 202, a performance information integration unit 203, a task transmission/reception unit 204, and a task storage unit 205.

The task generation unit 101 generates a task to be processed by the analysis node 100. A task is processing (analysis processing) to be performed in the analysis node 100. Specifically, a task may include, for example, a face recognition processing for a person included in an image, a sex determination processing for the face-recognized person, and the like. The task generation unit 101 accepts, for example, input information input from an external device, and generates a task based on the input information. An external device is, for example, a surveillance camera or a sensor. Input information is, for example, video data from a surveillance camera or data from a sensor.

The task determination unit 102 (task determination means) determines whether to execute a task in a target analysis node 100, or transfer execution of a task (execute distributed processing of a task) to a neighboring analysis node 100 (a neighboring server group), by use of a task generated by the task generation unit 101 or a task received by the task transmission/reception unit 106, and performance information in the performance information management unit 103. A task determined by the task determination unit 102 in a target analysis node 100 to be executed in the target analysis node 100 is executed by the task execution unit 104 in the target analysis node 100. A task for which distributed processing of the task to a neighboring analysis node 100 is determined by the task determination unit 102 to be executed is transmitted to the management node 200 by the task transmission/reception unit 106.

The performance information management unit 103 acquires performance information of the target analysis node 100, and transmits the performance information to the management node 200 by the performance information transmission/reception unit 107. The performance information management unit 103 also keeps integrated performance information transmitted by the management node 200. Details of integrated performance information will be described later.

When the task determination unit 102 determines to execute a certain task in the target analysis node 100, the task execution unit 104 (task execution means) executes the task.

On the basis of the performance information of the target analysis node 100 acquired by the performance information management unit 103, the surplus determination unit 105 determines whether the target analysis node 100 has surplus processing power (whether a resource of the target analysis node 100 has a surplus). Surplus processing power is processing power (calculation resource) remaining in the target analysis node 100 when the target analysis node 100 executes a task. When the target analysis node 100 has surplus processing power, the surplus determination unit 105 requests to execute a task in the task execution unit 104 according to a surplus task saved in the task storage unit 205. Details of a surplus task will be described later.

Note that the surplus determination unit 105 may acquire, from the management node 200, performance information of the target analysis node 100 acquired by the performance information management unit 103, and a surplus task saved in the task storage unit 205. Moreover, the surplus determination unit 105 may request the management node 200 that such information be transmitted from the management node 200. Thus, it is possible to take advantage of a surplus resource, and obtain a load distribution effect.

The task transmission/reception unit 106 transmits and receives a task of the analysis node 100, and a surplus task saved in the task storage unit 205. For example, the task transmission/reception unit 106 receives a task transmitted by the task transmission/reception unit 204 of the management node 200. For example, the task transmission/reception unit 106 also transmits, to the management node 200, a task determined by the task determination unit 102 to be load-distributed to a neighboring analysis node 100.

The performance information transmission/reception unit 107 transmits and receives performance information and integrated performance information of an analysis node 100 and a neighboring analysis node 100. For example, the performance information transmission/reception unit 107 transmits, to the management node 200, performance information acquired by the performance information management unit 103. For example, the performance information transmission/reception unit 107 also receives integrated performance information transmitted by the performance information transmission/reception unit 201 of the management node 200.

The performance information transmission/reception unit 201 transmits and receives performance information pertaining to an analysis node 100, and integrated performance information. For example, the performance information transmission/reception unit 201 receives performance information transmitted by the performance information transmission/reception unit 107 of an analysis node 100, and saves the performance information in the performance information storage unit 202. For example, the performance information transmission/reception unit 201 also transmits integrated performance information to each analysis node 100.

The performance information storage unit 202 saves (holds) performance information of each analysis node 100. FIG. 4 is a diagram illustrating one example of performance information of an analysis node 100 saved in the performance information storage unit 202. As illustrated in FIG. 4, for example, performance information of an analysis node 100 includes an identifier (analysis node identifier (ID)) of each analysis node 100, throughput, a number of tasks waiting for processing, network delay information (NW delay information), and a date and a time when each piece of information is updated. Note that performance information of an analysis node 100 is not limited to the throughput, the number of tasks waiting for processing, and the network delay illustrated in FIG. 4, and may include information indicating performance of an analysis node 100, such as a memory consumption amount.

Furthermore, the performance information storage unit 202 saves integrated performance information representing information in which performance information of respective analysis nodes 100 is integrated by the performance information integration unit 203. FIG. 5 is a diagram illustrating one example of integrated performance information saved in the performance information storage unit 202. Integrated performance information is performance information of all neighboring analysis nodes 100. As illustrated in FIG. 5, for example, integrated performance information includes throughput of a task per unit time, a number of tasks waiting for processing, an integration value of a network delay (NW delay), a number of neighboring analysis nodes 100 being a target for integrated performance information, and a date and a time of integration. In the example illustrated in FIG. 5, a network delay is a delay time of a network when a task is transmitted from a target analysis node 100 to a target management node 200. Note that a network delay is not limited to a delay time, and may represent, for example, a number of router hops between an analysis node 100 and a management node 200.

The performance information integration unit 203 (performance information integration means) integrates performance information of respective analysis nodes 100 saved in the performance information storage unit 202, and saves the integrated performance information in the performance information storage unit 202.

The task transmission/reception unit 204 transmits and receives a task of the analysis node 100, and a surplus task saved in the task storage unit 205. For example, the task transmission/reception unit 204 receives a task transmitted from the task transmission/reception unit 106, and saves the task in the task storage unit 205 as a surplus task.

The task storage unit 205 saves a surplus task. FIG. 6 is a diagram illustrating one example of a surplus task saved in the task storage unit 205. As illustrated in FIG. 6, for example, a surplus task includes an identifier (task ID) of a task, an identifier (transmission node ID) of an analysis node 100 transmitting a task, data of a task, and a date when data of a task are received. An identifier of an analysis node 100 is identification information with which a target analysis node 100 can be uniquely specified in a target management node 200 (management server), as with an Internet Protocol (IP) address. An identifier of an analysis node 100 is not limited to an IP address. The task storage unit 205 in a management node 200 functions as a task saving unit (task saving means) which saves a task load-distributed by an analysis node 100.

Figure 7:
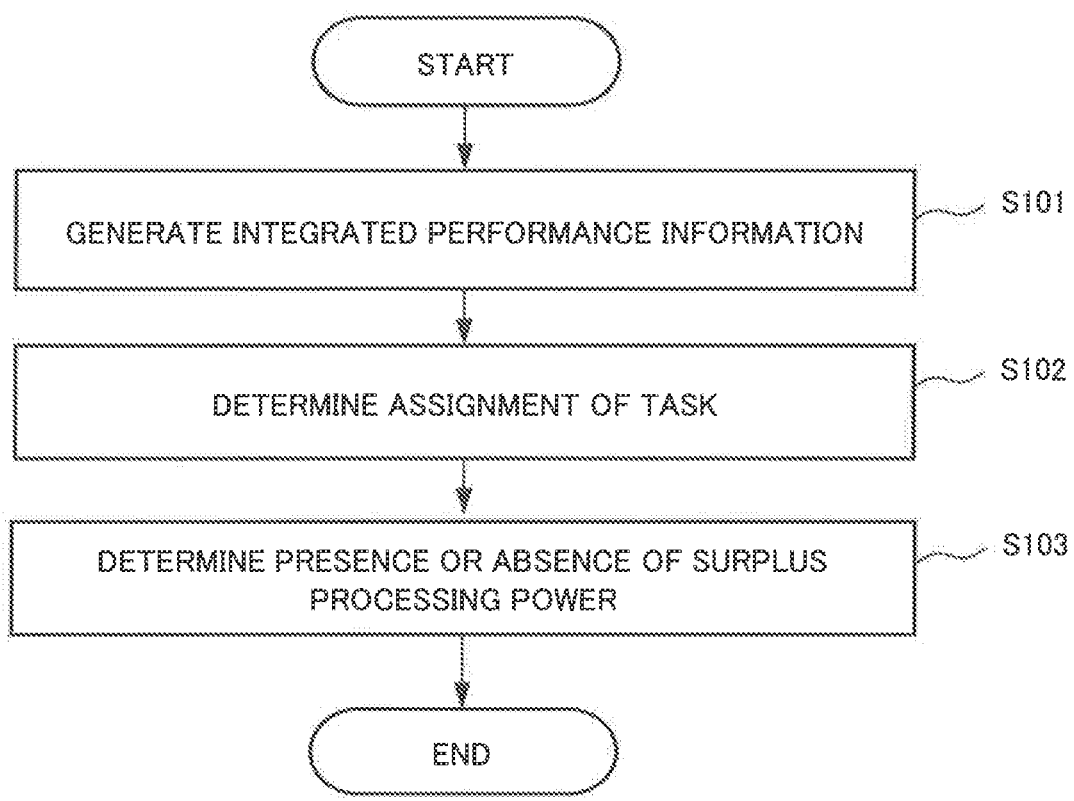
FIG. 7 is a flowchart illustrating an operation example of the distributed processing system in the first example embodiment of the present invention.

Next, an operation of the distributed processing system 10 in the present example embodiment is described. FIG. 7 is a flowchart illustrating an operation example of the distributed processing system 10 in the present example embodiment. The distributed processing system 10 generates integrated performance information (step S101). The distributed processing system 10 determines assignment of a task (step S102). The distributed processing system 10 determines presence or absence of surplus processing power (step S103).

Figure 8:
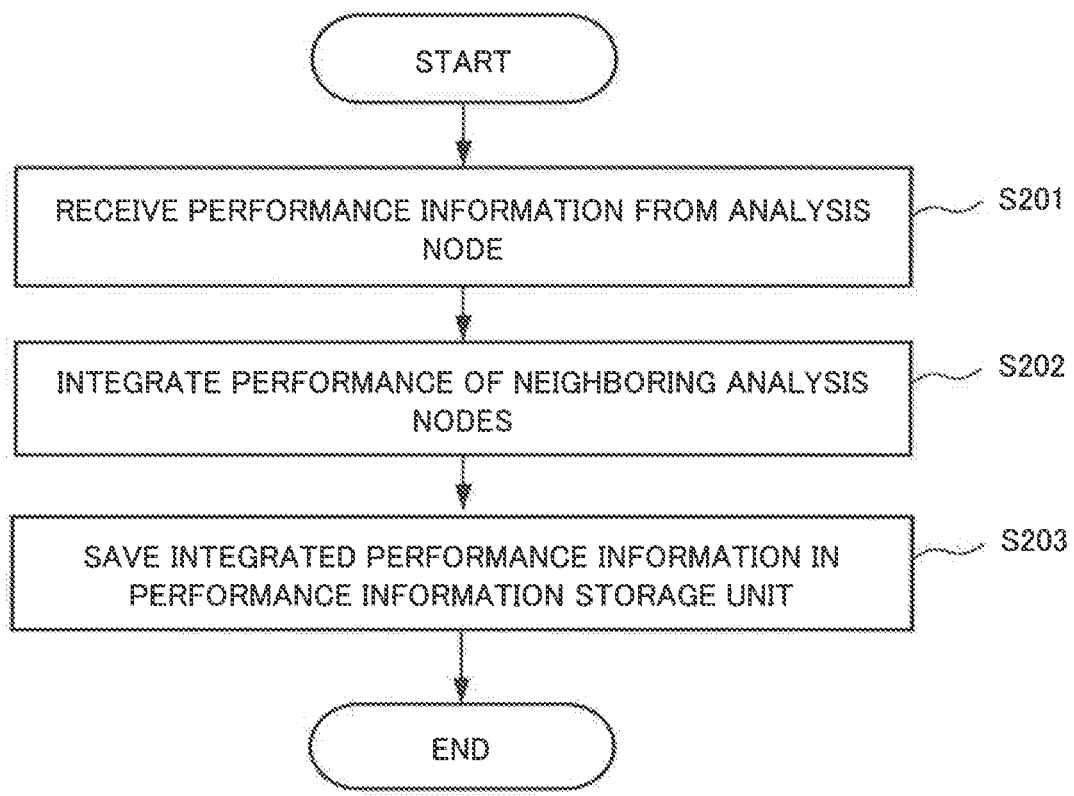
FIG. 8 is a flowchart illustrating an operation example of integrated performance information generation processing in the first example embodiment of the present invention.

Details of processing (integrated performance information generation processing) in step S101 are described below. FIG. 8 is a flowchart illustrating an operation example of integrated performance information generation processing by the distributed processing system 10 in the present example embodiment. The performance information transmission/reception unit 201 acquires performance information from each of neighboring analysis nodes 100, and saves the performance information in the performance information storage unit 202 (step S201). As in the specific example illustrated in FIG. 1, it is assumed that, in the distributed processing system 10, the analysis node A is a target analysis node 100, the management node A is a target management node 200, and the analysis node B, the analysis node D, and the analysis node E are neighboring analysis nodes 100, for example. In this case, the performance information transmission/reception unit 201 of the management node A acquires performance information of the analysis node B, the analysis node D, and the analysis node E, and saves performance information illustrated in FIG. 4 in the performance information storage unit 202 of the management node A.

The performance information integration unit 203 integrates performance information of neighboring analysis nodes 100 (step S202). For example, the performance information integration unit 203 of the management node A generates integrated performance information by statistically calculating performance information of the analysis node B, the analysis node D, and the analysis node E saved in the performance information storage unit 202 of the management node A. Such statistical calculation may include, for example, processing of calculating an average (average processing). Specifically, for example, as illustrated in FIG. 5, the performance information integration unit 203 calculates an average value "3.3 seconds per task" as integrated performance information from "2 seconds per task", "5 seconds per task", and "3 seconds per task", in throughput of the neighboring analysis nodes 100 illustrated in FIG. 4. Similarly, the performance information integration unit 203 calculates an average value "4" as integrated performance information from "0", "5", and "7", in a number of tasks waiting for processing. Similarly, the performance information integration unit 203 calculates an average value "1.67" as integrated performance information from "3.3", "0.6", and "1.1", in a network delay.

The performance information integration unit 203 saves the integrated performance information generated in step S202 in the performance information storage unit 202 (step S203). For example, the performance information integration unit 203 of the management node A saves, in the performance information storage unit 202 of the management node A, the integrated performance information generated by statistically calculating performance information of the analysis node B, the analysis node D, and the analysis node E.

The distributed processing system 10 (the performance information integration unit 203) generates integrated performance information by such processing. In other words, the management node 200 includes the performance information integration unit 203 which integrates performance information of connected analysis nodes 100.

Figure 9:
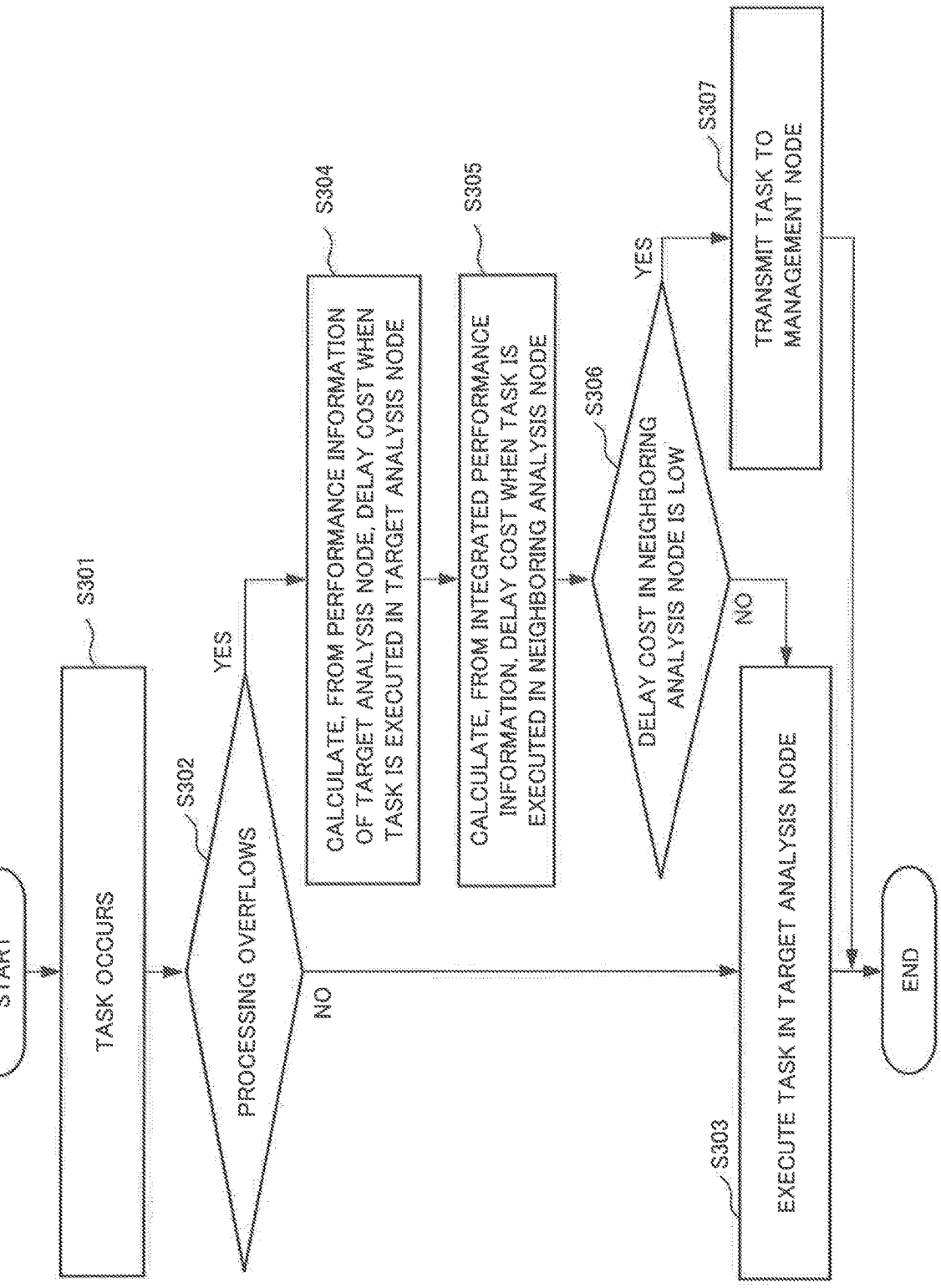
FIG. 9 is a flowchart illustrating an operation example of task assignment determination processing in the first example embodiment of the present invention.

Details of processing (task assignment determination processing) in step S102 are described below. FIG. 9 is a flowchart illustrating an operation example of task assignment determination processing by the distributed processing system 10 in the present example embodiment. A task is generated by the task generation unit 101, and a task thereby occurs (step S301). For example, the task generation unit 101 of the analysis node A generates a task on the basis of input information from an external device.

The task determination unit 102 acquires current performance information pertaining to a target analysis node 100 from the performance information management unit 103, and determines whether or not overflow of processing occurs in the target analysis node 100 (step S302). For example, the task determination unit 102 of the analysis node A compares a task generated by the task generation unit 101 of the analysis node A with current performance information owned by the performance information management unit 103 of the analysis node A, and determines whether or not processing overflows.

When processing does not overflow in the target analysis node 100 (No in the step S302), the task execution unit 104 of the target analysis node 100 executes the task (step S303).

When processing overflows in the target analysis node 100 (Yes in the step S302), the task determination unit 102 calculates, from performance information of the target analysis node 100, a delay cost when a task is executed in the target analysis node 100 (step S304). For example, the task determination unit 102 of the analysis node A acquires performance information thereof by the performance information management unit 103 of the analysis node A. Specifically, for example, the task determination unit 102 acquires, as calculation loads, "2 seconds per task" being average processing throughput, and "10" being a number of tasks waiting for processing. For example, by calculating "a number of tasks waiting for processing÷average throughput" from the average processing throughput "2 seconds per task" and the number of tasks waiting for processing "10", the task determination unit 102 of the analysis node A estimates that a delay cost (hereinafter, described as a "first cost") when a task is executed in the analysis node A is "5".

The task determination unit 102 calculates a delay cost when a task is executed in a neighboring analysis node 100, from integrated performance information saved in the performance information storage unit 202 (step S305). The task determination unit 102 of the analysis node A acquires, for example, integrated performance information saved in the performance information storage unit 202 of the management node A. Specifically, for example, the task determination unit 102 acquires, as integrated performance information, "3.3 seconds per task" being average processing throughput, "4" being a number of tasks waiting for processing, and "1.67" being a network delay. From the average processing throughput "3.3 seconds per task", the number of tasks waiting for processing "4", and the network delay "1.67", the task determination unit 102 of the analysis node A calculates, as follows, a delay cost (hereinafter, described as a "second cost") when processing of distributing a task to the analysis node B, the analysis node D, and the analysis node E is executed. Specifically, by calculating "a number of tasks waiting for processing÷average throughput+network delay" by use of each of the above-described numerical values, the task determination unit 102 estimates the second cost to be "2.88".

The task determination unit 102 compares the first cost with the second cost, and determines whether to execute a task in a target analysis node 100, or execute processing of distributing a task to a neighboring analysis node 100 (step S306). When the second cost is lower than the first cost (Yes in the step S306), the task transmission/reception unit 106 transmits a task to the management node 200 (step S307). When the first cost is lower than the second cost (No in the step S306), the task execution unit 104 of the target analysis node 100 executes the task (step S303). For example, the task determination unit 102 of the analysis node A arithmetically compares the calculated value "5" of the first cost with the value "2.88" of the second cost. In the case of the present example, because the second cost is lower than the first cost, the task transmission/reception unit 106 of the analysis node A transmits a task to the management node A. The management node A saves the task (surplus task) transmitted from the analysis node A in the task storage unit 205.

The distributed processing system 10 (the task determination unit 102) determines assignment of a task by such processing. In other words, an analysis node 100 (the task determination unit 102) calculates, on the basis of performance information of a certain analysis node 100, the first cost of executing a task in the analysis node 100. Moreover, on the basis of performance information integrated by the performance information integration unit 203, the analysis node 100 calculates the second cost of load-distributing a task to a neighboring analysis node 100. On the basis of the calculated first cost and second cost, the analysis node 100 determines whether to execute a task in the analysis node 100, or execute load distribution of a task to a neighboring analysis node 100.

Note that an aspect in which the task determination unit 102 according to the present example embodiment estimates a cost by an arithmetical calculation using a momentary value (e.g., performance information at a certain point) has been described above. The present example embodiment is not limited to this. An estimation method of a cost by the task determination unit 102 may include such a method of temporarily storing a cost shift during a certain time period in the past, estimating whether the time is a period when a processing load is high or a slack period, and thereby reflecting the estimation in cost calculation.

A description is given below by use of a specific example. In the specific example described below, it is assumed, for example, that a cost of a target analysis node 100 in past 4 cycles shifts as "1", "2", "1", and "5". It is also assumed that a cost of a neighboring analysis node 100 in past 4 cycles shifts as "5", "8", "7", and "2.88". In this case, for example, the task determination unit 102 may calculate each cost calculation in consideration of past data. Specifically, the task determination unit 102 may calculate the first cost as "3.125", for example, by calculating "(((((1+2)÷2)+1)÷2)+5)/2" in consideration of a past cost shift. Moreover, the task determination unit 102 may calculate the second cost as "4.815", for example, by calculating "(((((5+8)÷2)+7)÷2.88)+5)/2" in consideration of a past cost shift. From a result of comparing the first cost with the second cost, the task determination unit 102 determines that the target analysis node 100 executes a task.

Furthermore, an estimation method of a cost by the task determination unit 102 may include a scheme of changing a calculation method of a cost depending on a shift of performance information instead of a shift of a cost, a scheme of integrating weight with a cost, and the like. In other words, the task determination unit 102 can adopt a suitable scheme of calculating the first cost by use of a history of the first cost, and calculating the second cost by use of a history of the second cost.

Figure 10:
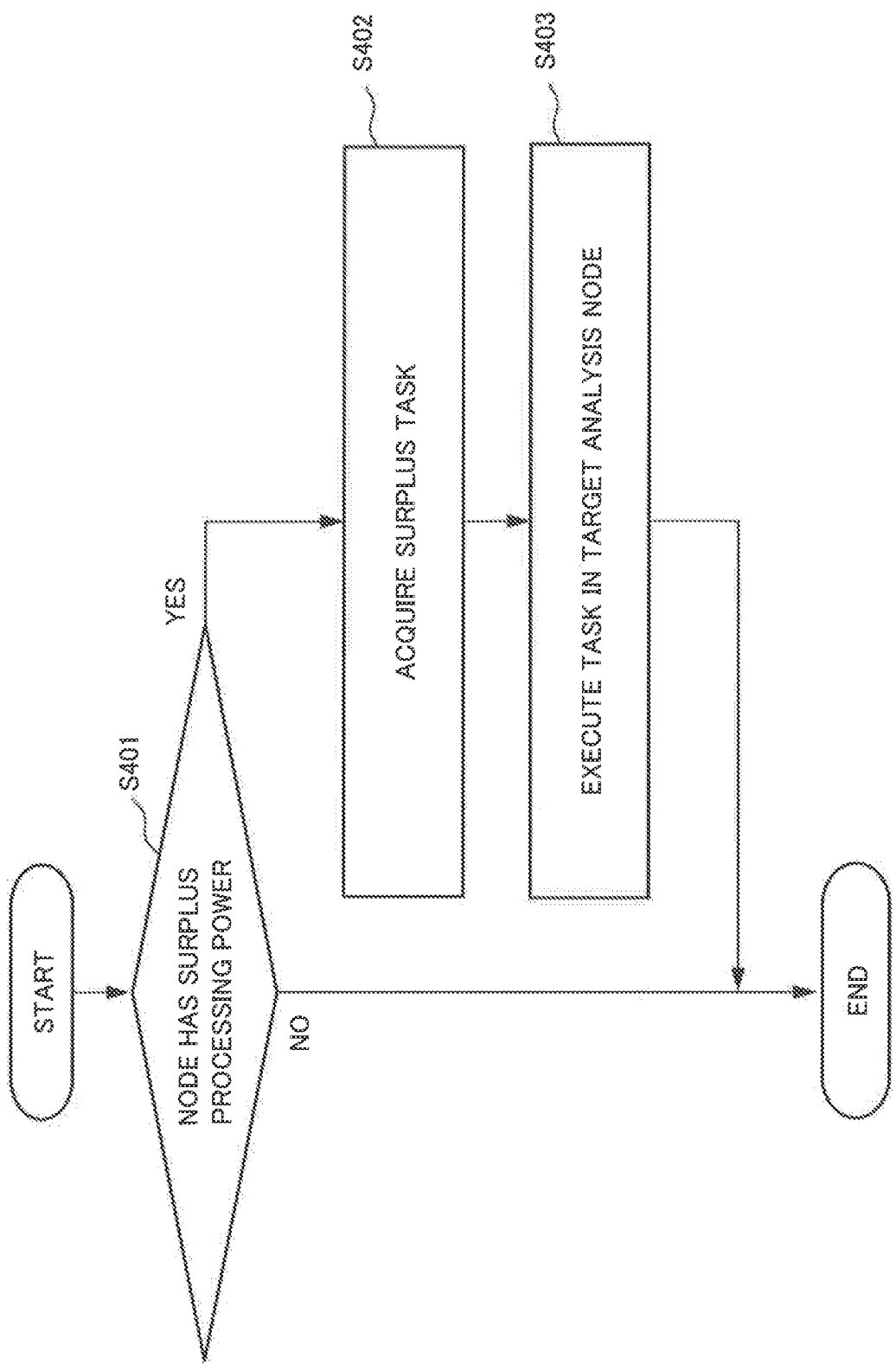
FIG. 10 is a flowchart illustrating an operation example of surplus processing power determination processing in the first example embodiment of the present invention.

Details of surplus processing power determination processing in step S103 are described below. FIG. 10 is a flowchart illustrating an operation example of surplus processing power determination by the distributed processing system 10 in the present example embodiment. The surplus determination unit 105 acquires performance information of a target analysis node 100, and determines whether or not the target analysis node 100 has surplus processing power (step S401). For example, the surplus determination unit 105 of the analysis node A acquires performance information of the analysis node A from the performance information management unit 103 of the analysis node A, and estimates from the performance information whether the analysis node A has a surplus of a calculation resource, by use of a preset threshold value or the like. Specifically, the surplus determination unit 105 acquires, for example, a number of tasks waiting for processing (e.g., "1") as a calculation load. The surplus determination unit 105 refers to a threshold value (e.g., "2"). In this case, when a number of tasks waiting for processing (e.g., "1") is a value lower than the threshold value (e.g., "2"), the surplus determination unit 105 determines that task acquisition is possible.

When the target analysis node 100 has surplus processing power (Yes in the step S401), the task transmission/reception unit 106 acquires a surplus task saved in the task storage unit 205 (step S402). For example, when the analysis node A has surplus processing power, the task transmission/reception unit 106 acquires a surplus task saved in the task storage unit 205 of the analysis node A. In the case of the specific example illustrated in FIG. 6, the surplus determination unit 105 acquires, for example, a surplus task with a task ID "1" being a task registered first among surplus tasks saved in the task storage unit 205.

The task execution unit 104 executes the surplus task acquired by the surplus determination unit 105 (step S403). For example, the task execution unit 104 of the analysis node A executes a surplus task with a task ID "1". When the target analysis node 100 has no surplus processing power (No in the step S401), the distributed processing system 10 ends the processing.

Note that an aspect in which the surplus determination unit 105 according to the present example embodiment acquires a surplus task from the task storage unit 205 by a first in first out (FIFO) scheme has been described above, but the present example embodiment is not limited to this. A surplus task acquisition method by the surplus determination unit 105 may include, for example, a scheme of determining a execution priority degree of a task from a composite index such as a data size of a task, and acquiring a surplus task on the basis of the execution priority degree of the task.

The distributed processing system 10 (the surplus determination unit 105) determines presence or absence of surplus processing power by such processing.

As described above, the distributed processing system 10 according to the present example embodiment generates integrated performance information, determines assignment of a task, and determines presence or absence of surplus processing power. Thus, the distributed processing system 10 can correctly determine an assignee of a task (hereinafter, described as a "task assignee") even when a processing load frequently varies. Particularly, in the distributed processing system 10 according to the present example embodiment, the performance information integration unit 203 generates integrated performance information by statistically processing performance information of all neighboring analysis nodes 100. In the distributed processing system 10 according to the present example embodiment, the task determination unit 102 assigns a task by use of integrated performance information having less variation than performance information of the individual analysis node 100. Consequently, the distributed processing system 10 can widen a collection interval of performance information, as compared with a case where an individual piece of performance information is used.

Herein, the technique disclosed in PTL 1 directly gives and receives collected processing-related information of all peripheral devices among devices. In the technique disclosed in PTL 1, when processing-related information is collected in near real time, combinations of connection among devices increase because all devices are interconnected. Thus, a network load becomes high. In other words, the technique disclosed in PTL 1 has a problem that a network load resulting from communication of processing-related information becomes high when a number of devices increases. In contrast, the distributed processing system 10 according to the present example embodiment is configured in such a way that a plurality of analysis nodes 100 do not directly exchange performance information, but acquire performance information via the performance information storage unit 202 of the management node 200. Thus, it is possible to suppress an increase of a network load resulting from communication of performance information.

Furthermore, in the technique disclosed in PTL 1, each device assigns a destination device to which processing is distributed, with reference to processing-related information of another device. Thus, at a point when a certain destination device receives processing, there is a possibility that a load of the destination device is already high, and a processing wait occurs. In other words, the technique disclosed in PTL 1 has a problem that fluctuation occurs in a processing wait time of distributed processing. In contrast, in the distributed processing system 10 according to the present example embodiment, the task determination unit 102 calculates, with reference to integrated performance information generated by the performance information integration unit 203, a cost when an input processing task is processed by a target analysis node 100, and a cost when an input processing task is distributed to a peripheral analysis node 100. In the distributed processing system 10 according to the present example embodiment, the task determination unit 102 compares the calculated costs, and thus determines a processing target (transmission destination). Thus, according to the distributed processing system 10 in the present example embodiment, fluctuation of a processing wait time of distributed processing can be reduced, and appropriate distributed processing is achieved.

Second Example Embodiment

Figure 11:
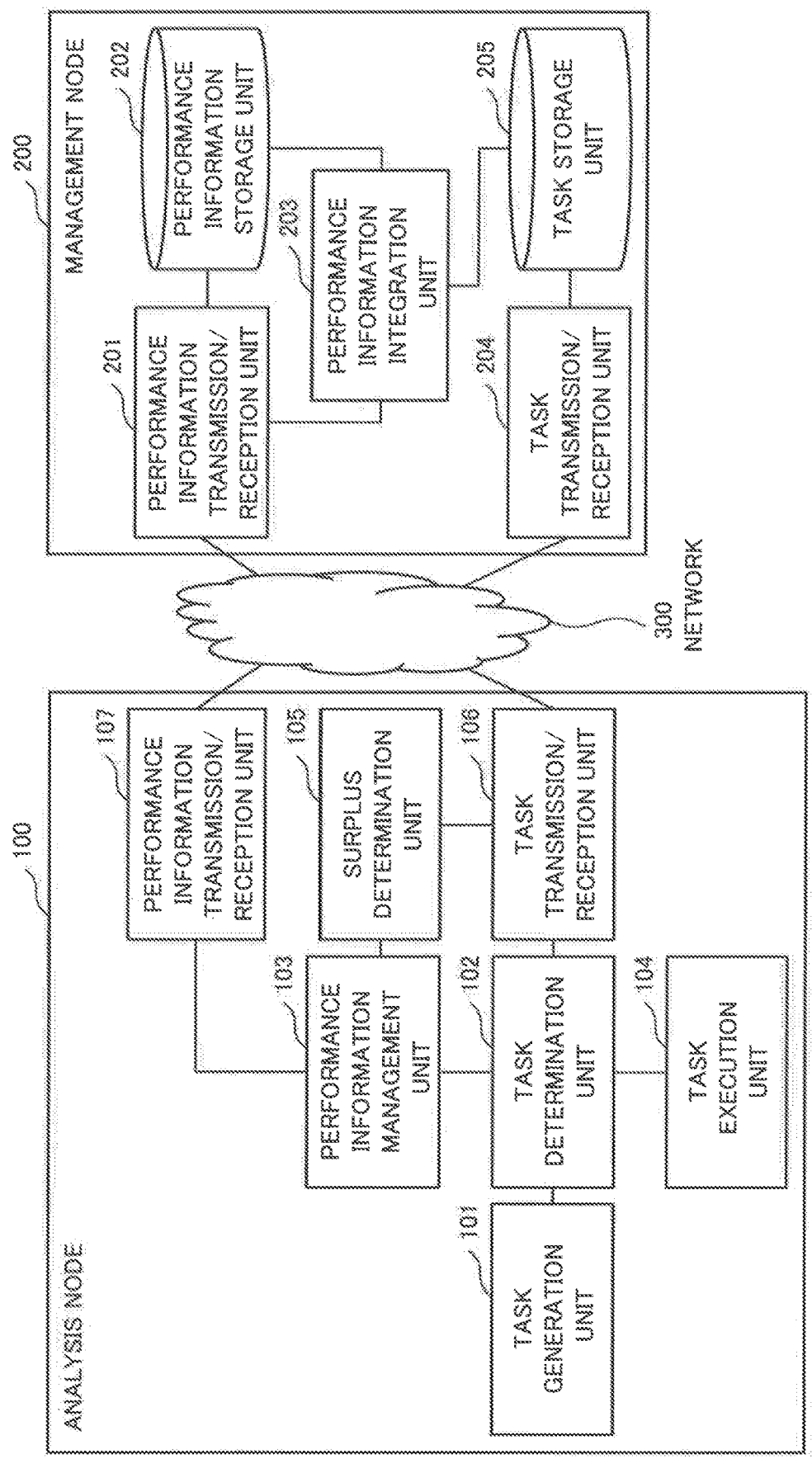
FIG. 11 is a block diagram illustrating a functional configuration of a distributed processing system in a second example embodiment of the present invention.

Next, a function of a distributed processing system 10 in the second example embodiment is described. FIG. 11 is a block diagram illustrating a functional configuration of the distributed processing system 10 in the present example embodiment. In the distributed processing system 10 according to the present example embodiment, a performance information integration unit 203 and a task storage unit 205 are connected in a management node 200, in addition to the distributed processing system 10 according to the first example embodiment.

The performance information integration unit 203 according to the present example embodiment integrates performance information of an analysis node 100 saved in a performance information storage unit 202 with a surplus task saved in the task storage unit 205, and saves integrated performance information in the performance information storage unit 202. FIG. 12 is a diagram illustrating one example of integrated performance information saved in the performance information storage unit 202. Integrated performance information according to the present example embodiment is performance information of all neighboring analysis nodes 100 for a management node 200 in which surplus task information saved in the task storage unit 205 of the management node 200 is considered. As illustrated in FIG. 12, integrated performance information according to the present example embodiment includes, for example, task processing throughput per unit time, a number of tasks waiting for processing, an integration value of a NW delay, a number of analysis nodes 100 used for integration ("number of nodes" in FIG. 12), and a date and a time of integration. In the present example, a network delay represents a network delay time required to transmit a task from a target analysis node 100 to a target management node 200.

Note that a network delay according to the present example embodiment is not limited to a delay time, and may represent, for example, a number of router hops between an analysis node 100 and a management node 200, or the like. Moreover, performance information according to the present example embodiment is not limited to a processing load or a network delay, and may include information such as a memory consumption amount.

Figure 13:
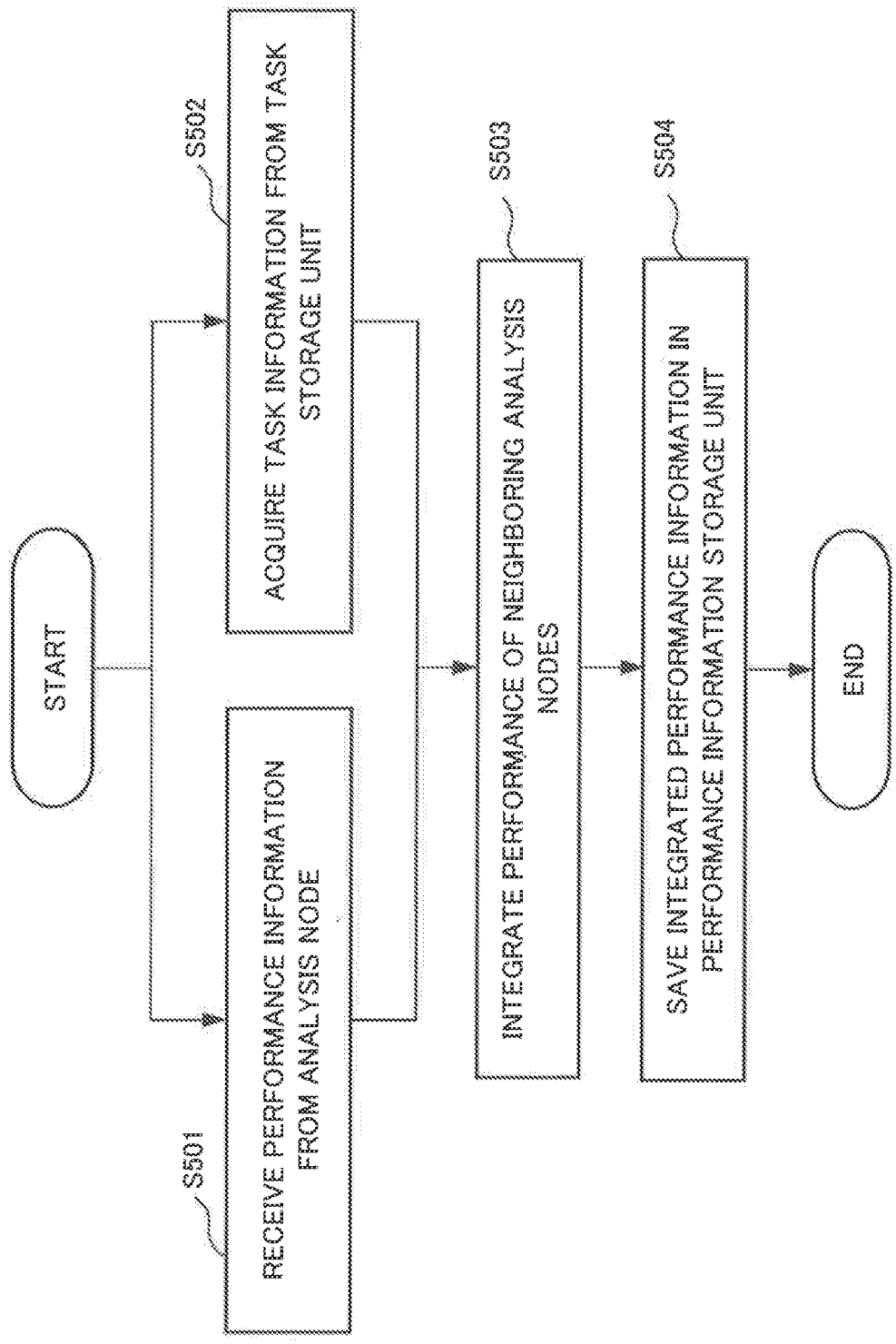
FIG. 13 is a flowchart illustrating an operation example of integrated performance information generation processing in the second example embodiment of the present invention.

Details of integrated performance information generation processing by the distributed processing system 10 according to the present example embodiment are described below. FIG. 13 is a flowchart illustrating an operation example of integrated performance information generation processing by the distributed processing system 10 according to the present example embodiment. A performance information transmission/reception unit 201 acquires performance information from an analysis node 100, and saves the performance information in the performance information storage unit 202 as performance information of each analysis node 100 (step S501). In the case of the specific example illustrated in FIG. 1, for example, the performance information transmission/reception unit 201 of the management node A acquires performance information of the analysis node B, the analysis node D, and the analysis node E, and saves the performance information in the performance information storage unit 202 of the management node A.

The performance information integration unit 203 acquires a surplus task saved in the task storage unit 205 (step S502). For example, the performance information integration unit 203 of the management node A acquires a surplus task of the analysis node A saved in the task storage unit 205 of the management node A.

The performance information integration unit 203 generates integrated performance information of neighboring analysis nodes 100 on the basis of the acquired performance information of the analysis node 100, and a surplus task (step S503). For example, the performance information integration unit 203 generates integrated performance information by statistically calculating acquired performance information of the analysis node B, the analysis node D, and the analysis node E, and surplus tasks of the analysis node B and the analysis node D. Such statistical calculation may include, for example, average processing. In the case of the specific example illustrated in FIG. 4, for example, as throughput of neighboring analysis nodes 100, the performance information integration unit 203 calculates "3.3 seconds per task" from an average value of "2 seconds per task", "5 seconds per task", and "3 seconds per task". Similarly, as a network delay, the performance information integration unit 203 calculates "1.67" being an average value of "3.3", "0.6", and "1.1". The performance information integration unit 203 calculates an average by adding "0", "5", and "7" being numbers of tasks waiting for processing illustrated in FIG. 4, and "2" being a number of tasks of surplus tasks illustrated in FIG. 6, and dividing the result by "3" being a number of nodes. In other words, the performance information integration unit 203 calculates a value "4.6" as integrated performance information (a number of tasks waiting for processing) by calculating "(12+2) ÷3".

The performance information integration unit 203 saves, in the performance information storage unit 202, integrated performance information generated in step S503 (step S504). For example, the performance information integration unit 203 of the management node A saves, in the performance information storage unit 202 of the management node A, integrated performance information generated by statistically calculating performance information of the analysis node B, the analysis node D, and the analysis node E, and surplus tasks of the analysis node B and the analysis node D.

The distributed processing system 10 (the performance information integration unit 203) generates integrated performance information based on performance information and a surplus task by such processing.

As described above, the distributed processing system 10 according to the present example embodiment generates integrated performance information based on performance information and a surplus task, determines assignment of a task, and determines presence or absence of surplus processing power. Thus, the distributed processing system 10 can correctly determine a task assignee even when a processing load frequently varies.

In the distributed processing system 10 according to the present example embodiment, when the performance information integration unit 203 generates integrated performance information, integrated performance information is generated in consideration of tasks waiting for processing in all of a plurality of neighboring analysis nodes 100 saved in the task storage unit 205, in addition to performance information of each analysis node 100 of the performance information storage unit 202. Consequently, the distributed processing system 10 can widen a collection interval of performance information, as compared with a case where integrated performance information is generated from an individual piece of performance information alone.

Third Example Embodiment

Figure 14:
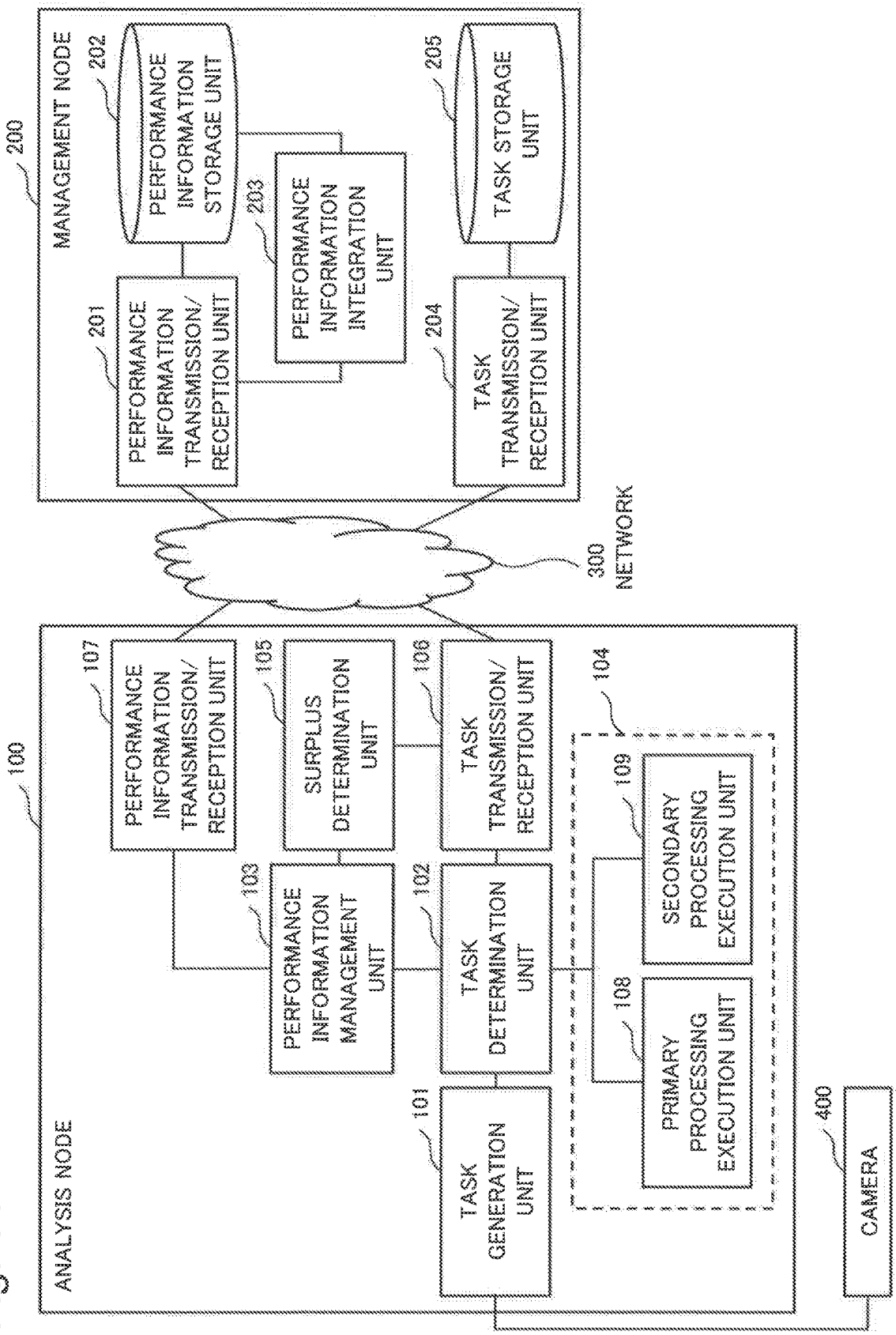
FIG. 14 is a block diagram illustrating a functional configuration of a distributed processing system in a third example embodiment of the present invention.

Next, a function of a distributed processing system 10 in the third example embodiment is described. FIG. 14 is a block diagram illustrating a functional configuration of the distributed processing system 10 according to the present example embodiment. In addition to the distributed processing system 10 according to the first example embodiment, the distributed processing system 10 according to the present example embodiment further includes a camera 400. The camera 400 is connected to an analysis node 100 (the task generation unit 101). In the analysis node 100 according to the present example embodiment, a task execution unit 104 further includes a primary processing execution unit 108 and a secondary processing execution unit 109.

The task generation unit 101 according to the present example embodiment receives input information such as a video image or an image input by the camera 400, and sound, and generates a primary processing task to be processed by the analysis node 100.

For a primary processing task generated by the task generation unit 101 and a secondary processing task generated by the primary processing execution unit 108, a task determination unit 102 determines an execution destination of each task (an analysis node 100 which executes each task). For example, the task determination unit 102 determines whether to execute a task in a target analysis node 100, or execute processing of distributing a task to a neighboring analysis node 100, by use of a secondary processing task generated by the task execution unit 104, or a secondary processing task received by a task transmission/reception unit 106, and performance information of a performance information management unit 103. For example, when a task is composed of primary processing of detecting a target from input information and secondary processing of analyzing a target, a task determination unit 102 determines whether to execute the secondary processing after executing the primary processing, or execute distribution of a load of secondary processing to a neighboring analysis node 100.

The task execution unit 104 executes, in the primary processing execution unit 108, a primary processing task generated by the task generation unit 101. The task execution unit 104 receives a secondary processing task being a result of primary processing, and sends the secondary processing task to the task determination unit 102.

On the basis of the performance information of the target analysis node 100 acquired by the performance information management unit 103, a surplus determination unit 105 determines whether the target analysis node 100 has surplus processing power for the secondary processing task. When the target analysis node 100 has surplus processing power, the surplus determination unit 105 requests to execute a task in the task execution unit 104 (the secondary processing execution unit 109) on the basis of a surplus secondary processing task saved in a task storage unit 205. When the target analysis node 100 has surplus processing power, the distributed processing system 10 acquires, by the task transmission/reception unit 106, a task saved in the task storage unit 205 via a task transmission/reception unit 204, and executes the task by the task execution unit 104. By operating in such a way, the distributed processing system 10 obtains a load distributing effect.

The primary processing execution unit 108 executes a primary processing task generated by the task generation unit 101. The primary processing task is, for example, processing (task) of detecting a plurality of targets from input information. The primary processing execution unit 108 generates a secondary processing task being an execution result of the primary processing task.

The secondary processing execution unit 109 executes a secondary processing task determined by the task determination unit 102 to be executed. The secondary processing task is, for example, processing (task) of analyzing each target detected by primary processing.

The camera 400 acquires information such as video data, image data, and sound data, and sends the acquired information to an analysis node 100 (the task generation unit 101) as input information.

Figure 15:
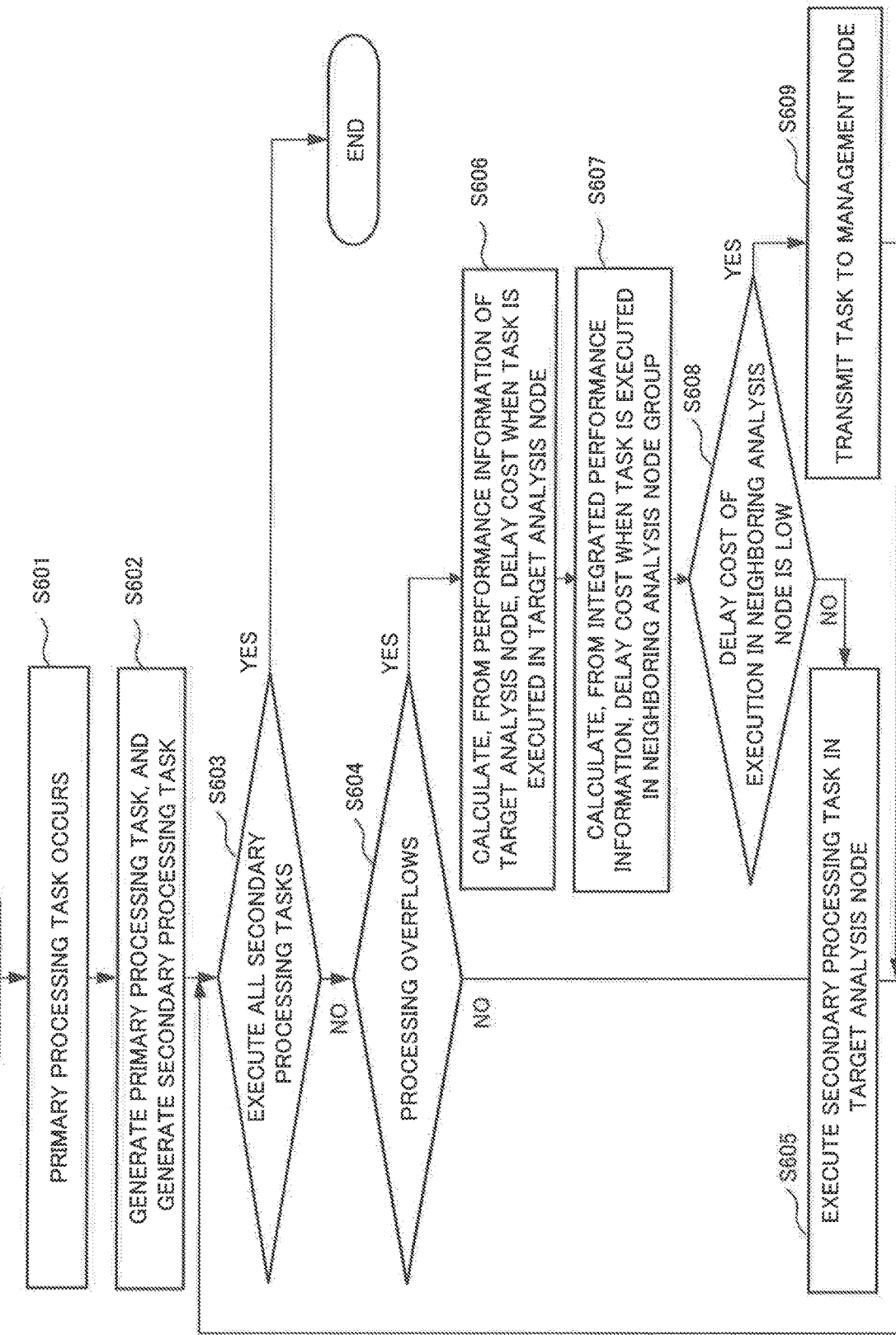
FIG. 15 is a flowchart illustrating an operation example of task assignment determination processing in the third example embodiment of the present invention.

Details of task assignment determination processing by the distributed processing system 10 according to the present example embodiment are described below. FIG. 15 is a flowchart illustrating an operation example of task assignment determination processing by the distributed processing system 10 according to the present example embodiment. On the basis of the input information acquired by the camera 400, the task generation unit 101 generates a primary processing task, and a task thereby occurs (step S601). For example, the task generation unit 101 of an analysis node A generates a task on the basis of input information from an external device.

The primary processing execution unit 108 executes the primary processing task generated by the task generation unit 101, and generates a secondary processing task (step S602).

The task determination unit 102 determines whether all secondary processing tasks generated by the primary processing execution unit 108 are processed (step S603). When a secondary processing task is generated in step S602, the task assignment determination processing by the distributed processing system 10 according to the present example embodiment determines that there is a secondary processing task to be processed by the task determination unit 102 (No in the step S603), and proceeds to a step S604.

The task determination unit 102 acquires current performance information of a target analysis node 100 from the performance information management unit 103, and determines whether overflow of processing occurs in the target analysis node 100 (step S604).

When processing does not overflow in the target analysis node 100 (No in the step S604), the secondary processing execution unit 109 of the target analysis node 100 executes the secondary processing task (step S605).

When processing overflows in the target analysis node 100 (Yes in the step S604), the task determination unit 102 calculates, from performance information of the target analysis node 100, a delay cost (first cost) when a secondary processing task is executed in the target analysis node 100 (step S606).

The task determination unit 102 calculates a delay cost (second cost) when a secondary processing task is executed in a neighboring analysis node 100, from integrated performance information saved in a performance information storage unit 202 (step S607).

The task determination unit 102 compares the first cost with the second cost when a secondary processing task is executed, and determines whether to execute a secondary processing task in a target analysis node 100, or execute processing of distributing a secondary processing task to a neighboring analysis node 100 (step S608). For example, when the second cost is lower than the first cost (Yes in the step S608), the task transmission/reception unit 106 transmits a secondary processing task to a management node 200 (step S609). For example, when the first cost is less than or equal to the second cost (No in the step S608), the secondary processing execution unit 109 of the target analysis node 100 executes the secondary processing task (step S605).

Note that the distributed processing system 10 according to the present example embodiment may repetitively execute the processing (task assignment determination processing) in the steps S604 to S609 until all secondary processing tasks are executed. When all secondary processing tasks are completed (Yes in the step S603), execution of the task assignment determination processing by the distributed processing system 10 according to the present example embodiment is finished.

The distributed processing system 10 (the task determination unit 102) determines assignment of a secondary processing task by such processing.

Figure 16:
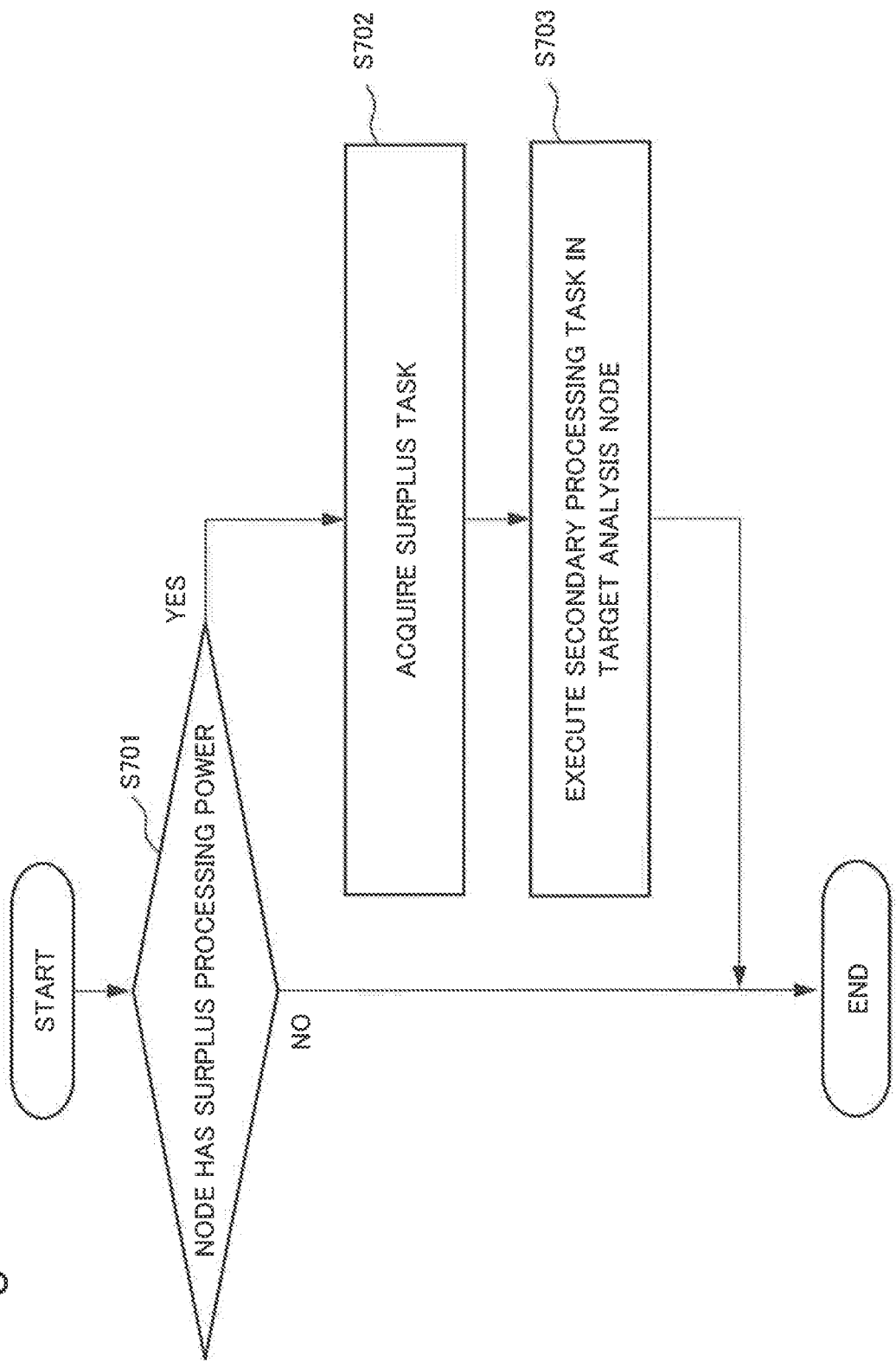
FIG. 16 is a flowchart illustrating an operation example of surplus processing power determination processing in the third example embodiment of the present invention.

Details of surplus processing power determination processing by the distributed processing system 10 according to the present example embodiment are described below. FIG. 16 is a flowchart illustrating an operation example of surplus processing power determination processing by the distributed processing system 10 according to the present example embodiment.

The surplus determination unit 105 acquires performance information of a target analysis node 100, and determines whether or not the target analysis node 100 has surplus processing power (step S701).

When the target analysis node 100 has surplus processing power (Yes in the step S701), the task transmission/reception unit 106 acquires a surplus task (secondary processing task) saved in the task storage unit 205 (step S702).

The secondary processing execution unit 109 executes a secondary processing task acquired by the surplus determination unit 105 (step S703). When the target analysis node 100 has no surplus processing power (No in the step S701), the distributed processing system 10 ends the processing.

The distributed processing system 10 (the surplus determination unit 105) determines presence or absence of surplus processing power by such processing.

As described above, the distributed processing system 10 according to the present example embodiment generates integrated performance information, determines assignment of a secondary processing task, and determines presence or absence of surplus processing power. Thus, the distributed processing system 10 can correctly determine a task assignee even when a processing load frequently varies.

In the distributed processing system 10 according to the present example embodiment, the task execution unit 104 is subdivided into the primary processing execution unit 108 and the secondary processing execution unit 109. The target analysis node 100 is configured to distribute processing pertaining to a surplus secondary processing task after the task execution unit 104 executes a primary processing task generated by the task generation unit 101. Consequently, the distributed processing system 10 can widen a collection interval of performance information, as compared with a case where integrated performance information is generated from an individual piece of performance information alone.

Another Example Embodiments

Figure 17:
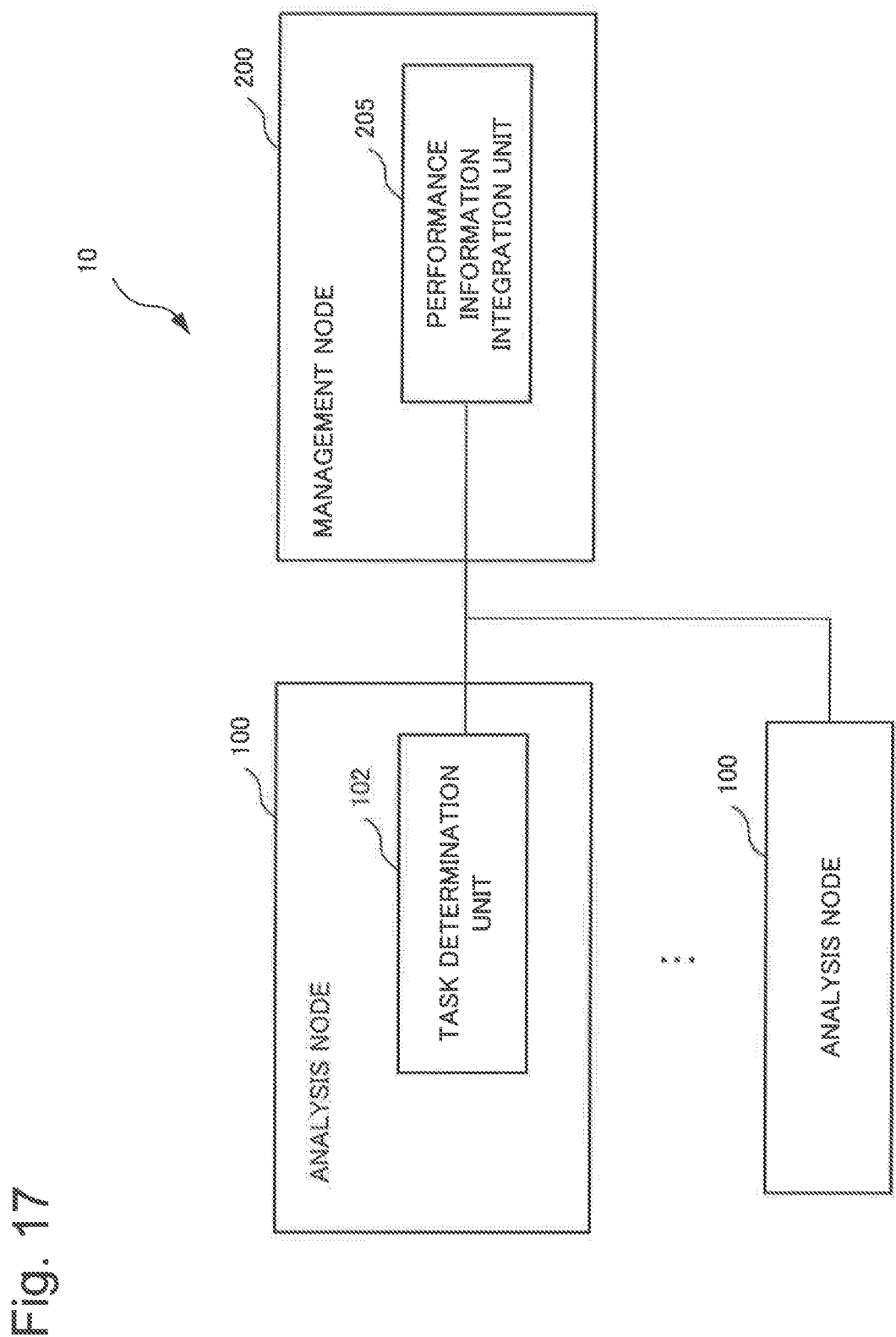
FIG. 17 is a schematic configuration diagram of a distributed processing system in the example embodiment of the present invention.

FIG. 17 is a schematic configuration diagram of the distributed processing system 10 in the example embodiment described above. In a distributed processing system 10 illustrated in FIG. 17, a certain target analysis node 100 analyzes input information, and calculates, on the basis of performance information representing performance of the target analysis node 100 itself, a cost (first cost) when the target analysis node 100 itself executes the task.

Furthermore, on the basis of performance information pertaining to another analysis node 100 integrated by a management node 200 which manages (holds) performance information pertaining to another analysis node 100, the analysis node 100 calculates a cost (second cost) when a certain task is distributed to and then executed by the another analysis node 100. On the basis of the calculated first cost and second cost, the analysis node 100 determines whether the analysis node 100 itself executes a certain task, or a task is distributed to and then executed by the another neighboring analysis node 100. In other words, the distributed processing system 10 illustrated in FIG. 17 can achieve a function of load distribution of distributing, depending on the first cost and the second cost calculated in an analysis node 100, a load required for execution of a certain task to a neighboring analysis node 100.

As illustrated in FIG. 17, the distributed processing system 10 includes an analysis node 100 which analyzes input information, and a management node 200. The management node 200 is connected to the analysis node 100 via a network, and manages performance information of the analysis node 100. The management node 200 may be configured to hold performance information pertaining to the analysis node 100 connected via a network.

The management node 200 has a performance information integration unit 203 which integrates performance information of connected analysis nodes 100. The target analysis node 100 has a task determination unit 102. The task determination unit 102 in the target analysis node 100 may be configured to calculate a first cost of executing a task on the basis of performance information representing the local analysis node 100 itself. Moreover, the task determination unit 102 in the target analysis node 100 may be configured to calculate a second cost of distributing a task to a neighboring analysis node 100 on the basis of performance information integrated by the performance information integration unit 203. On the basis of the calculated first cost and second cost, the task determination unit 102 in the target analysis node 100 determines whether to execute a task in the local analysis node 100 itself, or distribute a load of a task to a neighboring analysis node 100

The present invention is not limited to the example embodiments described above, and can be suitably changed without departing from the spirit of the present invention.

Some or all of the example embodiments described above may be described as, but are not limited to, the following supplementary notes.

[Supplementary Note 1]

A distributed processing system including:

an analysis node which analyzes input information; and a management node which is connected to the analysis node via a network, and manages performance information of the analysis node, wherein the management node includes a performance information integration unit which integrates performance information of the connected analysis node, and the analysis node includes a task determination unit which determines, based on a first cost of executing, based on performance information, a task, and a second cost of load-distributing, based on performance information integrated by the performance information integration unit, the task to a neighboring analysis node, whether to execute the task, or execute load distribution of the task to the neighboring analysis node.

[Supplementary Note 2]

The distributed processing system according to Supplementary note 1, wherein the task determination unit determines, when the task is composed of primary processing of detecting a target from the input information, and secondary processing of analyzing the target, whether to execute the secondary processing, or execute load distribution of the secondary processing to the neighboring analysis node, after executing the primary processing.

[Supplementary Note 3]

The distributed processing system according to Supplementary note 1 or 2, wherein the management node includes a task saving unit which saves a task load-distributed by the analysis node, and the analysis node includes a task execution unit which executes a task saved in the task saving unit when the analysis node has a surplus in a resource thereof.

[Supplementary Note 4]

The distributed processing system according to any one of Supplementary notes 1 to 3, wherein the performance information integration unit integrates the performance information by statistically calculating the performance information.

[Supplementary Note 5]

The distributed processing system according to Supplementary note 3 or 4, wherein the performance information integration unit integrates the performance information by use of one or a combination of a number of tasks saved in the task saving unit, an input amount, and an output amount, in addition to the performance information.

[Supplementary Note 6]

The distributed processing system according to any one of Supplementary notes 1 to 5, wherein the task determination unit calculates, from the performance information, the first cost by use of a communication delay time and a processing delay time when the task is executed, and calculates the second cost by use of a communication delay time and a processing delay time when the task is load-distributed to the neighboring analysis node by use of the integrated performance information.

[Supplementary Note 7]

The distributed processing system according to any one of Supplementary notes 1 to 6, wherein the task determination unit calculates the first cost by use of a history of the first cost, and calculates the second cost by use of a history of the second cost.

[Supplementary Note 8]

The distributed processing system according to any one of Supplementary notes 1 to 7, wherein the performance information includes throughput of the analysis node, and a network delay.

[Supplementary Note 9]

A distributed processing method including:

analyzing input information;

managing performance information of an analysis node;

integrating performance information of the analysis node connected to a management node via a network; and determining, based on a first cost of executing, based on performance information, a task, and a second cost of load-distributing, based on performance information being integrated, the task to a neighboring analysis node, whether to execute the task, or execute load distribution of the task to the neighboring analysis node.

[Supplementary Note 10]

A program which causes a computer to execute:

processing of analyzing input information;

processing of managing performance information of an analysis node;

performance information integration processing of integrating performance information of the analysis node connected to a management node via a network; and task determination processing of determining, based on a first cost of executing, based on performance information, a task, and a second cost of load-distributing, based on performance information integrated by the performance information integration processing, the task to a neighboring analysis node, whether to execute the task, or execute load distribution of the task to the neighboring analysis node.

[Supplementary Note 11]

A distributed processing device including:

a task generation unit which generates a task from input information;

a performance information acquisition unit which acquires performance information, and integrated performance information integrating performance information of a neighboring distributed processing device; and a task determination unit which determines, based on a first cost of executing, based on the performance information, the task, and a second cost of load-distributing, based on the integrated performance information, the task to the neighboring distributed processing device, whether to execute the task, or execute load distribution of the task to the neighboring distributed processing device.

[Supplementary Note 12]

A distributed processing system including:

an analysis node which analyzes input information; and a management node which is connected to the analysis node via a network, and holds performance information representing performance of the analysis node, wherein the management node includes a performance information integration means for integrating the performance information pertaining to the analysis node connected to the management node, and the analysis node includes a task determination means for determining,
- based on a first cost, being calculated based on the performance information pertaining to the analysis node, of executing a task in the analysis node, and
- a second cost being calculated based on the performance information pertaining to another of the analysis nodes different from the analysis node integrated by the performance information integration means, and representing a cost of load distribution of distributing the task to the another analysis node and then executing the task,
- whether to execute the task in the analysis node, or distribute the task to the another analysis node and then execute the task.

[Supplementary Note 13]

The distributed processing system according to Supplementary note 12, wherein the task determination means in the analysis node
- determines, when the task includes primary processing being processing of detecting a target from the input information, and secondary processing being processing of analyzing the target, whether to execute the secondary processing in the analysis node, or distribute the secondary processing to the analysis node and then execute the secondary processing, after executing the primary processing.

[Supplementary Note 14]

The distributed processing system according to Supplementary note 12 or 13, wherein the management node further includes a task saving means for saving the task load-distributed by the analysis node, and the analysis node further includes a task execution means for executing the task saved in the task saving means when the analysis node has a surplus in a resource thereof.

[Supplementary Note 15]

The distributed processing system according to any one of Supplementary notes 12 to 14, wherein the performance information integration means integrates the performance information by statistically calculating the performance information.

[Supplementary Note 16]

The distributed processing system according to Supplementary note 14, wherein the performance information integration means integrates the performance information by use of
- the performance information, and
- one or a combination of a number of tasks saved in the task saving means, an input amount, and an output amount.

[Supplementary Note 17]

The distributed processing system according to any one of Supplementary notes 12 to 16, wherein the task determination means calculates the first cost by use of a communication delay time and a processing delay time, which are included in the performance information, when the task is executed, and calculates the second cost by use of a communication delay time and a processing delay time, which are included in the integrated performance information, when the task is distributed to the another analysis node and then executed.

[Supplementary Note 18]

The distributed processing system according to any one of Supplementary notes 12 to 17, wherein the task determination means calculates the first cost at a certain point by use of a history of the first cost representing a shift of the first cost during a certain period before a certain point, and calculates the second cost at a certain point by use of a history of the second cost representing a shift of the second cost during a certain period before a certain point.

[Supplementary Note 19]

The distributed processing system according to any one of Supplementary notes 12 to 18, wherein the performance information includes throughput of the analysis node, and a network delay.

[Supplementary Note 20]

A distributed processing method including:

by an analysis node, analyzing input information;

calculating a first cost of executing a task by the analysis node itself, based on performance information representing performance of the analysis node itself;

calculating a second cost representing a cost of load distribution of distributing the task to another of the analysis nodes and then executing the task, based on performance information which is integrated by a management node holding performance information pertaining to one or more of the analysis nodes connected to the management node via a network, and which pertains to the another analysis node; and determining, based on the calculated first cost and second cost, whether to execute the task by the analysis node itself, or execute load distribution of the task to the another analysis node.

[Supplementary Note 21]

A recording medium recording a program which causes a computer functioning as an analysis node to execute:

processing of analyzing input information;

processing of calculating a first cost of executing a task by the computer itself, based on performance information representing performance of the computer itself;

processing of calculating a second cost representing a cost of load distribution of distributing the task to another of the analysis nodes and then executing the task, based on performance information which is integrated by a management node holding performance information pertaining to one or more of the analysis nodes connected to the management node via a network, and which pertains to the another analysis node; and processing of determining, based on the calculated first cost and second cost, whether to execute the task by the computer itself, or execute load distribution of the task to the another analysis node.

[Supplementary Note 22]

A distributed processing device including:

a task generation unit which generates a task from input information;

a performance information acquisition unit which acquires integrated performance information integrating performance information of a local device with performance information of another distributed processing device; and a task determination unit which determines, based on a first cost being calculated based on the performance information of the local device and representing a cost of executing the task in the local device, and a second cost being calculated based on the integrated performance information and representing a cost of distributing the task to the another distributed processing device and then executing the task, whether to execute the task in the local device, or load the task onto the another distributed processing device and then execute the task.

As above, the present invention has been described based on the exemplary embodiments. An exemplary embodiment is just an illustration, and various kinds of changes, addition or subtraction and combinations may be added to each of the above-mentioned exemplary embodiments unless it deviates from the main points of the present invention. It is understood by a person skilled in the art that modification made by adding such changes, addition/subtraction and combinations are also included in the scope of the present invention.

This application is based upon and claims the benefit of priority from Japanese Patent Application No. 2016-190473, filed on Sep. 29, 2016, the disclosure of which is incorporated herein in its entirety by reference.

REFERENCE SIGNS LIST

10 Distributed processing system
100 Analysis node
101 Task generation unit
102 Task determination unit
103 Performance information management unit
104 Task execution unit
105 Surplus determination unit
106 Task transmission/reception unit
107 Performance information transmission/reception unit
108 Primary processing execution unit
109 Secondary processing execution unit
200 Management node
201 Performance information transmission/reception unit
202 Performance information storage unit
203 Performance information integration unit
204 Task transmission/reception unit
205 Task storage unit
300 Network
400 Camera
500 Computer device
501 CPU
502 ROM
503 RAM
504 Storage device
505 Drive device
506 Communication interface
507 Input/output interface
508 Program
509 Recording medium
510 Network

The invention claimed is:

1. A system for distributed processing of tasks comprising:
an analysis node which analyzes input information; and
a management node which is connected to the analysis node via a network, and holds performance information representing performance of the analysis node, wherein
the management node includes performance information integration unit-integrating the performance information pertaining to the analysis node connected to the management node, and
the analysis node includes task determination unit determining,
based on a first cost, being calculated based on the performance information pertaining to the analysis node, of executing a task in the analysis node, and
a second cost being calculated based on the performance information pertaining to another of the analysis nodes different from the analysis node integrated by the performance information integration unit, and representing a cost of load distribution of distributing the task to the another analysis node and then executing the task,
whether to execute the task in the analysis node, or distribute the task to the another analysis node and then execute the task,
wherein
the task determination unit
calculates the first cost by use of a communication delay time and a processing delay time, which are included in the performance information, when the task is executed, and
calculates the second cost by use of a communication delay time and a processing delay time, which are included in the integrated performance information, when the task is distributed to the another analysis node and then executed.

2. The system for distributed processing of tasks according to claim 1, wherein
the task determination unit in the analysis node
determines, when the task includes primary processing being processing of detecting a target from the input information, and secondary processing being processing of analyzing the target, whether to execute the secondary processing in the analysis node, or distribute the secondary processing to another of the analysis nodes and then execute the secondary processing, after executing the primary processing.

3. The system for distributed processing of tasks according to claim 1, wherein
the management node further includes task saving unit saving the task load-distributed by the analysis node, and
the analysis node further includes task execution unit executing the task saved in the task saving unit when the analysis node has a surplus in a resource thereof.

4. The system for distributed processing of tasks according to claim 1, wherein
the performance information integration unit integrates the performance information by statistically calculating the performance information.

5. The system for distributed processing of tasks according to claim 3, wherein
the performance information integration unit integrates the performance information of the analysis node, and a performance information of at least one of other analysis node connected to the management node.

6. The system for distributed processing of tasks according to claim 1, wherein
the task determination unit
calculates the first cost at a certain point of time by use of a history of the first cost representing a shift of the first cost during a certain period before a certain point of time, and
calculates the second cost at a certain point of time by use of a history of the second cost representing a shift of the second cost during a certain period before a certain point of time.

7. The system for distributed processing of tasks according to claim 1, wherein
the performance information includes throughput of the analysis node, and a network delay.

8. A distributed processing method comprising:
by an analysis node,
analyzing input information;
calculating a first cost of executing a task by the analysis node itself, based on performance information representing performance of the analysis node itself;

calculating a second cost representing a cost of load distribution of distributing the task to another of the analysis nodes and then executing the task, based on performance information which is integrated by a management node holding performance information pertaining to one or more of the analysis nodes connected to the management node via a network, and which pertains to the another analysis node; and determining, based on the calculated first cost and second cost, whether to execute the task by the analysis node itself, or execute load distribution of the task to the another analysis node, wherein when determining the task calculating the first cost by use of a communication delay time and a processing delay time, which are included in the performance information, when the task is executed, and calculating the second cost by use of a communication delay time and a processing delay time, which are included in the integrated performance information, when the task is distributed to the another analysis node and then executed.

9. A non-transitory computer readable recording medium recording a program which causes a computer functioning as an analysis node to execute:

processing of analyzing input information;

processing of calculating a first cost of executing a task by the computer itself, based on performance information representing performance of the computer itself;

processing of calculating a second cost representing a cost of load distribution of distributing the task to another of the analysis nodes and then executing the task, based on performance information which is integrated by a management node holding performance information pertaining to one or more of the analysis nodes connected to the management node via a network, and which pertains to the another analysis node; and processing of determining, based on the calculated first cost and second cost, whether to execute the task by the computer itself, or execute load distribution of the task to the another analysis node, wherein when processing of determining the task calculating the first cost by use of a communication delay time and a processing delay time, which are included in the performance information, when the task is executed, and calculating the second cost by use of a communication delay time and a processing delay time, which are included in the integrated performance information, when the task is distributed to the another analysis node and then executed.

* * * * *